(12) United States Patent
Kim et al.

(10) Patent No.: US 11,810,460 B2
(45) Date of Patent: Nov. 7, 2023

(54) AUTOMATIC GENERATION OF PEDESTRIANS IN VIRTUAL SIMULATION OF ROADWAY INTERSECTIONS

(71) Applicant: TOYOTA JIDOSHA KABUSHIKI KAISHA, Toyota (JP)

(72) Inventors: Baekgyu Kim, Mountain View, CA (US); Nikhil Bagul, Mountain View, CA (US); Shinichi Shiraishi, Mountain View, CA (US)

(*) Notice: Subject to any disclaimer, the term of this patent is extended or adjusted under 35 U.S.C. 154(b) by 700 days.

(21) Appl. No.: 15/847,081

(22) Filed: Dec. 19, 2017

(65) Prior Publication Data

US 2019/0189013 A1  Jun. 20, 2019

(51) Int. Cl.
*G08G 1/16* (2006.01)
*G08G 1/005* (2006.01)
(Continued)

(52) U.S. Cl.
CPC ............. *G08G 1/166* (2013.01); *B60W 40/00* (2013.01); *G01M 17/007* (2013.01);
(Continued)

(58) Field of Classification Search
CPC ...... G08G 1/166; G08G 1/005; G08G 1/0962; G08G 1/012; B60W 40/00; G01M 17/007
(Continued)

(56) References Cited

U.S. PATENT DOCUMENTS 9,120,484 B1 * 9/2015 Ferguson ............... B60W 30/08
9,459,840 B1 * 10/2016 Yu .......................... G06F 8/20
(Continued)

FOREIGN PATENT DOCUMENTS

CN  102034012       2/2013
CN  105388021 A  *  3/2016
(Continued)

OTHER PUBLICATIONS

Susan T. Chrysler, Omar Ahmad & Chris W. Schwarz (2015) Creating Pedestrian Crash Scenarios in a Driving Simulator Environment, Traffic Injury Prevention, 16:sup1, S12-S17, DOI: 10.1080/15389588.2015.1015001.*

(Continued)

*Primary Examiner* — Brian S Cook
(74) *Attorney, Agent, or Firm* — Burbage Law, P.C.; Jon-Michael Burbage

(57) ABSTRACT

The disclosure includes embodiments for automatically generating a virtual pedestrian for inclusion in a digital simulation. Some embodiments of a method may include automatically generating a virtual pedestrian based on a path specification and a behavior specification. The method may include executing a digital simulation that includes the virtual pedestrian crossing an intersection and a virtual vehicle responding to the virtual pedestrian crossing the intersection, wherein the digital simulation is operable to measure a performance of a virtual Advanced Driver Assistance System (virtualized "ADAS system") included in the virtual vehicle to protect the virtual pedestrian when responding to the virtual pedestrian crossing the intersection. The method may include displaying a set of visualizations on a display, wherein the set of visualizations on the display visually describe the performance of the virtual ADAS system to protect the virtual pedestrian when responding to the virtual pedestrian crossing the intersection.

20 Claims, 21 Drawing Sheets

(51) Int. Cl.
  *G08G 1/0962* (2006.01)
  *B60W 40/00* (2006.01)
  *G01M 17/007* (2006.01)
  *G08G 1/01* (2006.01)

(52) U.S. Cl.
  CPC ............ *G08G 1/005* (2013.01); *G08G 1/012* (2013.01); *G08G 1/0962* (2013.01)

(58) Field of Classification Search
  USPC .......................................................... 703/8
  See application file for complete search history.

(56) References Cited

U.S. PATENT DOCUMENTS

| | | | | |
|---|---|---|---|---|
| 9,836,895 | B1* | 12/2017 | Nygaard | G05D 1/0088 |
| 2008/0309468 | A1* | 12/2008 | Greene | G08G 1/166 |
| | | | | 340/436 |
| 2015/0332114 | A1* | 11/2015 | Springer | G06V 20/588 |
| | | | | 348/148 |
| 2016/0300485 | A1* | 10/2016 | Ayvaci | G08G 1/166 |
| 2017/0286570 | A1* | 10/2017 | Kim | G06F 11/3688 |
| 2017/0334450 | A1* | 11/2017 | Shiraishi | H04W 4/80 |
| 2019/0147737 | A1* | 5/2019 | Madduri | G08G 1/0129 |
| | | | | 701/117 |

FOREIGN PATENT DOCUMENTS

| JP | 2009019920 A | 1/2009 | |
|---|---|---|---|
| JP | 2009301295 A | * | 12/2009 |

OTHER PUBLICATIONS

Joueiai et al., SUMO2016—Traffic, Mobility, and Logistics, 2016.*
Susan T. Chrysler, Omar Ahmad & Chris W. Schwarz (2015) Creating Pedestrian Crash Scenarios in a Driving Simulator Environment, Traffic Injury Prevention, 16:sup1, S12-S17, DOI: 10.1080/15389588.2015.1015001 (Year: 2015).*
Joueiai et al., SUMO2016—Traffic, Mobility, and Logistics (Year: 2016).*
Guo et al. (Non-Patented Literature, "Modeling Pedestrian Violation Behavior at Signalized Crosswalks in China: A Hazards-Based Duration Approach") (Year: 2011).*
Zhuang et al. (Non-Patented Literature, "Pedestrians' crossing behaviors and safety at unmarked roadway in China") (Year: 2010).*
Wang et al. (Non-Patented Literature, "Individual differences of pedestrian behaviour in midblock crosswalk and intersection"). (Year: 2011).*
Yang et al. (Non-Patented Literature, "Modeling pedestrians' road crossing behavior in traffic system micro-simulation in China"). (Year: 2006).*
Das et al. (Non-Patented Literature, "Walk or Wait? An Empirical Analysis of Street Crossing Decisions"). (Year: 2005).*
Virtual_Prototyping_2017 (Wikipedia Archive dated Nov. 7, 2017 downloaded from Wikipedia) (Year: 2017).*
JPO, Office Action for Japanese Patent Application No. 2018-209420, dated Sep. 3, 2019, 2 pages.

* cited by examiner

A pedestrian may start walking in any position in the 5x5 region of interest $$(x_s \leq 5) \wedge (x_s \geq 0) \wedge (y_s \leq 5) \wedge (y_s \geq 0)$$

Any successive directional changes in X or Y-axis should be performed with min/max separation distance Path constraints for X-axis → $\wedge_i^j (((x_{i+1} - x_i) \geq D_{min}) \wedge ((x_{i+1} - x_i) \leq D_{max}))$ Path constraints for Y-axis → $\wedge_i^j (((y_{i+1} - y_i) \geq D_{min}) \wedge ((y_{i+1} - y_i) \leq D_{max}))$

Figure 4C

| Path Parameters | Number of direction changes | Distance between two adjacent direction changes (meters) | Margin size (meters) | # of paths |
|---|---|---|---|---|
| Path Spec 1 | 0 | (Min: 1 Max: 5) | 0 | 20 |
| Path Spec 2 | 3 | (Min: 1 Max: 5) | 0 | 20 |
| Path Spec 3 | 0 | (Min: 1 Max: 5) | 3 | 20 |
| Path Spec 4 | 3 | (Min: 1 Max: 5) | 3 | 20 |
| Path Spec 5 | 1 | (Min: 1 Max: 5) | 2 | 20 |
| Path Spec 6 | 2 | (Min: 1 Max: 5) | 2 | 20 |

Figure 6

| Behavior Parameters | Traffic law violation at start | Min waiting time | Max waiting time | Walk time |
|---|---|---|---|---|
| Behavior Spec 1 | No | 0 | 0 | Finish within green |
| Behavior Spec 2 | No | 2 | 5 | Finish within green |
| Behavior Spec 3 | Yes | -2 | -2 | Finish within green |
| Behavior Spec 4 | Yes | -2 | -5 | Fail to finish within green |

Test Setting 1

*Drivers' reaction time to brake: 1 sec
*Number of right turn: 180

| Behavior /Path Spec | Behavior Spec 1 | Behavior Spec 2 | Behavior Spec 3 |
|---|---|---|---|
| Path spec 1 | 7.22% | 0.55% | 12.22% |
| Path spec 2 | 3.88% | 3.88% | 3.33% |
| Path spec 3 | 7.77% | 1.66% | 10.55% |
| Path spec 4 | 12.22% | 3.88% | 8.89% |
| Path spec 5 | 10.00% | 3.33% | 10.00% |
| Path spec 6 | 8.33% | 3.88% | 3.88% |

Test Setting 2

*Drivers' reaction time to brake: 3 sec
*Number of right turn: 180

| Behavior /Path Spec | Behavior Spec 1 | Behavior Spec 2 | Behavior Spec 3 |
|---|---|---|---|
| Path spec 1 | 14.44% | 17.22% | 24.44% |
| Path spec 2 | 19.44% | 21.11% | 22.22% |
| Path spec 3 | 21.66% | 18.33% | 20.55% |
| Path spec 4 | 22.77% | 23.33% | 28.88% |
| Path spec 5 | 16.66% | 19.44% | 24.44% |
| Path spec 6 | 31.66% | 27.22% | 28.33% |

Figure 9

$$\forall\, 0 \leq i \leq n-3,\ \theta_{min} \leq \left| \frac{y_{i+1} - y_i}{x_{i+1} - x_i} - \frac{y_{i+2} - y_{i+1}}{x_{i+2} - x_{i+1}} \right| \leq \theta_{max}$$

$$\theta_{min} \leq \left| \frac{z_{i+1} - z_i}{x_{i+1} - x_i} - \frac{z_{i+2} - z_{i+1}}{x_{i+2} - x_{i+1}} \right| \leq \theta_{max}$$

Coverage Criteria 1103

AUTOMATIC GENERATION OF PEDESTRIANS IN VIRTUAL SIMULATION OF ROADWAY INTERSECTIONS

BACKGROUND

The specification relates to tuning a vehicle control system for a connected vehicle based on a user profile for a driver and the characteristic behavior of the vehicle. The vehicle may have a plurality of drivers and the vehicle control system may be tuned differently for the different drivers.

An automotive system may include a vehicle. Vehicles increasingly include vehicle control systems. For example, a vehicle may be an autonomous vehicle or include an Advanced Driver Assistance System (herein an "ADAS system" if singular or "ADAS systems" if plural).

ADAS systems that protect pedestrians who are present at roadway intersections are becoming increasingly popular. This trend will continue as automated vehicles become a reality.

SUMMARY

ADAS systems that protect pedestrians who are present at roadway intersections are becoming increasingly popular. Vehicle manufacturers would like to be able to test such ADAS systems using simulation tools such as CarSim™ or Prescan™ instead of relying on real-world road testing (i.e., virtualized testing instead of real-world testing). CarSim is produced and distributed by Mechanical Simulation Corporation of Ann Arbor, Mich. Prescan is produced and distributed by Tass International of Helmond, Netherlands.

One important obstacle to using simulation tools to test the performance of ADAS systems in protecting pedestrians at intersections is the amount of time it takes for design engineers to manually program the simulation tool to create dozens or hundreds of unique and realistic virtual pedestrians for inclusion in the virtualized testing. Currently this is done in an ad-hoc fashion, and is very time consuming. This approach is also problematic since there is no guarantee that the virtual pedestrians created by the design engineers in an ad-hoc fashion will be realistic or conform to testing standards. If the virtual pedestrians are not realistic or do not conform to testing standards, then the virtualized testing is invalid and of little use.

Described herein are embodiments of a pedestrian generation module that solve these problems by automatically generating virtual pedestrians for inclusion in the virtualized testing of the performance of ADAS systems to protect pedestrians at intersections using one or more digital simulations. In some embodiments, when the pedestrian generation module is initialized by users (e.g., design engineers) with appropriate variables selected from applicable industry or manufacturer testing standards, the virtual pedestrians created by the pedestrian generation module are guaranteed to be realistic and conform to industry and manufacturer testing standards.

In some embodiments, the pedestrian generation module is a standalone simulation tool. In some embodiments, the pedestrian generation module is a plugin for an existing simulation tool such as CarSim or Prescan.

There is no existing solution which automatically generates virtual pedestrians for inclusion in virtualized tests which measure the performance of ADAS systems when attempting to protect pedestrians at intersections. An advantage of the pedestrian generation module, and improvement relative to existing solutions, is the ability of the pedestrian generation module to realistically generate descriptions of pedestrian walking paths and pedestrian behavior based on a path specification and a behavior specification. The path specification and the behavior specification are generated by the pedestrian generation module at a design time (see, e.g., FIG. 1B) using digital data that describes accident reports, industry testing standards and manufacturer testing standards. These descriptions of pedestrian walking paths and pedestrian behavior allow our invention to automatically generate many different unique and realistic virtual pedestrians, each having their own unique behavior, thereby reducing the time and cost required for design engineers or other users to manually generate virtual pedestrians in an ad hoc fashion, or the time and cost required for real-world testing (e.g., road testing).

An additional benefit of the pedestrian generation module is that the pedestrian generation module guarantees that the virtual pedestrians it generates behave realistically (as measured against real-world accident reports) and conform to both manufacturer testing standards and international testing standards. This is because the path specification and the behavior specification are generated by the pedestrian generation module using digital data that describes accident reports, industry testing standards and manufacturer testing standards. No other existing solution, whether based on automatic or manual generation of virtual pedestrians, can provide a similar guarantee of both realism and conformance with both industry and manufacturer testing standards.

The embodiments described herein include a system, method and computer program product for automatically generating a virtual pedestrian for inclusion in a digital simulation that is configured to test a performance of a virtual ADAS system which is designed to protect virtual pedestrians while they are crossing an intersection of a roadway. The digital simulation is used to determine whether the design of the ADAS system will be modified based on its performance as measured by how well the virtual ADAS system protects the virtual protection while crossing an intersection included in the digital simulation.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: automatically generating a virtual pedestrian based on a path specification and a behavior specification; executing a digital simulation that includes the virtual pedestrian crossing an intersection and a virtual vehicle responding to the virtual pedestrian crossing the intersection, where the digital simulation is operable to measure a performance of a virtual ADAS system included in the virtual vehicle to protect the virtual pedestrian when responding to the virtual pedestrian crossing the intersection; and displaying a set of visualizations on a display, where the set of visualizations on the display visually describe the performance of the virtual ADAS system to protect the virtual pedestrian when responding to the virtual pedestrian crossing the intersection. Other embodiments of this aspect include corresponding computer systems, apparatus, and computer programs recorded on one or more computer storage devices, each configured to perform the actions of the methods.

Implementations may include one or more of the following features. The method where the path specification describes a path constraint of the virtual pedestrian within the digital simulation. The method where the path specification describes one or more of the following: how often the virtual pedestrian changes its direction while crossing the intersection; a distance traveled by the virtual pedestrian between two successive directional changes while crossing the intersection; a start region for the virtual pedestrian to begin their crossing of the intersection and an end region for the virtual pedestrian to end their crossing of the intersection; and a crosswalk area at the intersection where the virtual pedestrian crosses the intersection, where the crosswalk area includes a crosswalk and area proximate to the crosswalk where the virtual pedestrian crosses the intersection to model illegal behavior. The method where the path specification does not include a series of geographic coordinates traveled by the virtual pedestrian when crossing the intersection. The method where the behavior specification describes how the virtual pedestrian reacts to an event within the digital simulation. The method where the behavior specification includes one or more timed automata that describes how the virtual pedestrian reacts to an event within the digital simulation as time changes within the digital simulation. The method where the behavior specification describes one or more of the following: how long the virtual pedestrian will wait for crossing the intersection once a traffic light changes from red to green; and how the virtual pedestrian modifies its walking speed as the traffic light is about to change from green to red. The method where the path specification and the behavior specification are determined at a design time using digital data that describes one or more real-world accident reports that describe a walking path and behavior of one or more real-world pedestrians who were injured by vehicles at one or more real-world roadway intersections. The method where automatically generating the virtual pedestrian includes a plurality of virtual pedestrians being automatically generated without a user providing inputs specific to each of the plurality of virtual pedestrians so that a workload of the user is decreased relative to being required to provide inputs specific to each of the plurality of virtual pedestrians. Implementations of the described techniques may include hardware, a method or process, or computer software on a computer-accessible medium.

One general aspect includes a computer program product including a non-transitory memory storing computer-executable code that, when executed by a processor, causes the processor to: automatically generate a virtual pedestrian based on a path specification and a behavior specification; execute a digital simulation that includes the virtual pedestrian crossing an intersection and a virtual vehicle responding to the virtual pedestrian crossing the intersection, where the digital simulation is operable to measure a performance of a virtual ADAS system included in the virtual vehicle to protect the virtual pedestrian when responding to the virtual pedestrian crossing the intersection; and cause a display to depict a set of visualizations that visually describe the performance of the virtual ADAS system to protect the virtual pedestrian when responding to the virtual pedestrian crossing the intersection. Other embodiments of this aspect include corresponding computer systems, apparatus, and computer programs recorded on one or more computer storage devices, each configured to perform the actions of the methods.

Implementations may include one or more of the following features. The computer program product where the path specification describes a path constraint of the virtual pedestrian within the digital simulation. The computer program product where the path specification describes one or more of the following: how often the virtual pedestrian changes its direction while crossing the intersection; a distance traveled by the virtual pedestrian between two successive directional changes while crossing the intersection; a start region for the virtual pedestrian to begin their crossing of the intersection and an end region for the virtual pedestrian to end their crossing of the intersection; and a crosswalk area at the intersection where the virtual pedestrian crosses the intersection, where the crosswalk area includes a crosswalk and area proximate to the crosswalk where the virtual pedestrian crosses the intersection to model illegal behavior. The computer program product where the path specification does not include a series of geographic coordinates traveled by the virtual pedestrian when crossing the intersection. The computer program product where the behavior specification describes how the virtual pedestrian reacts to an event within the digital simulation. The computer program product where the behavior specification includes one or more timed automata that describes how the virtual pedestrian reacts to an event within the digital simulation as time changes within the digital simulation. The computer program product where the behavior specification describes one or more of the following: how long the virtual pedestrian will wait for crossing the intersection once a traffic light changes from red to green; and how the virtual pedestrian modifies its walking speed as the traffic light is about to change from green to red. The computer program product where the path specification and the behavior specification are determined at a design time using digital data that describes one or more real-world accident reports that describe a walking path and behavior of one or more real-world pedestrians who were injured by vehicles at one or more real-world roadway intersections. The computer program product where the virtual pedestrian is operable to behave realistically because it is generated based on the one or more real-world accident reports. The computer program product where automatically generating the virtual pedestrian includes a plurality of virtual pedestrians being automatically generated without a user providing inputs specific to each of the plurality of virtual pedestrians so that a workload of the user is decreased relative to being required to provide inputs specific to each of the plurality of virtual pedestrians. Implementations of the described techniques may include hardware, a method or process, or computer software on a computer-accessible medium.

One general aspect includes a system including: a processor communicatively coupled to a display and a non-transitory memory, where the processor is operable to execute computer code stored in the non-transitory memory and the computer code is operable, when executed by the processor, to cause the processor to: automatically generate a virtual pedestrian based on a path specification and a behavior specification; execute a digital simulation that includes the virtual pedestrian crossing an intersection and a virtual vehicle responding to the virtual pedestrian crossing the intersection, where the digital simulation is operable to measure a performance of a virtual ADAS system included in the virtual vehicle to protect the virtual pedestrian when responding to the virtual pedestrian crossing the intersection; and cause the display to depict a set of visualizations that visually describe the performance of the virtual ADAS system to protect the virtual pedestrian when responding to the virtual pedestrian crossing the intersection. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 4C is a block diagram illustrating an example of path specification data that includes defined variables for the path specification according to some embodiments.

FIG. 6 is a block diagram illustrating an input visualization for inputting variables for a path specification according to some embodiments.

FIG. 9 is a block diagram illustrating a second visualization according to some embodiments.

DETAILED DESCRIPTION

Figure 1A:
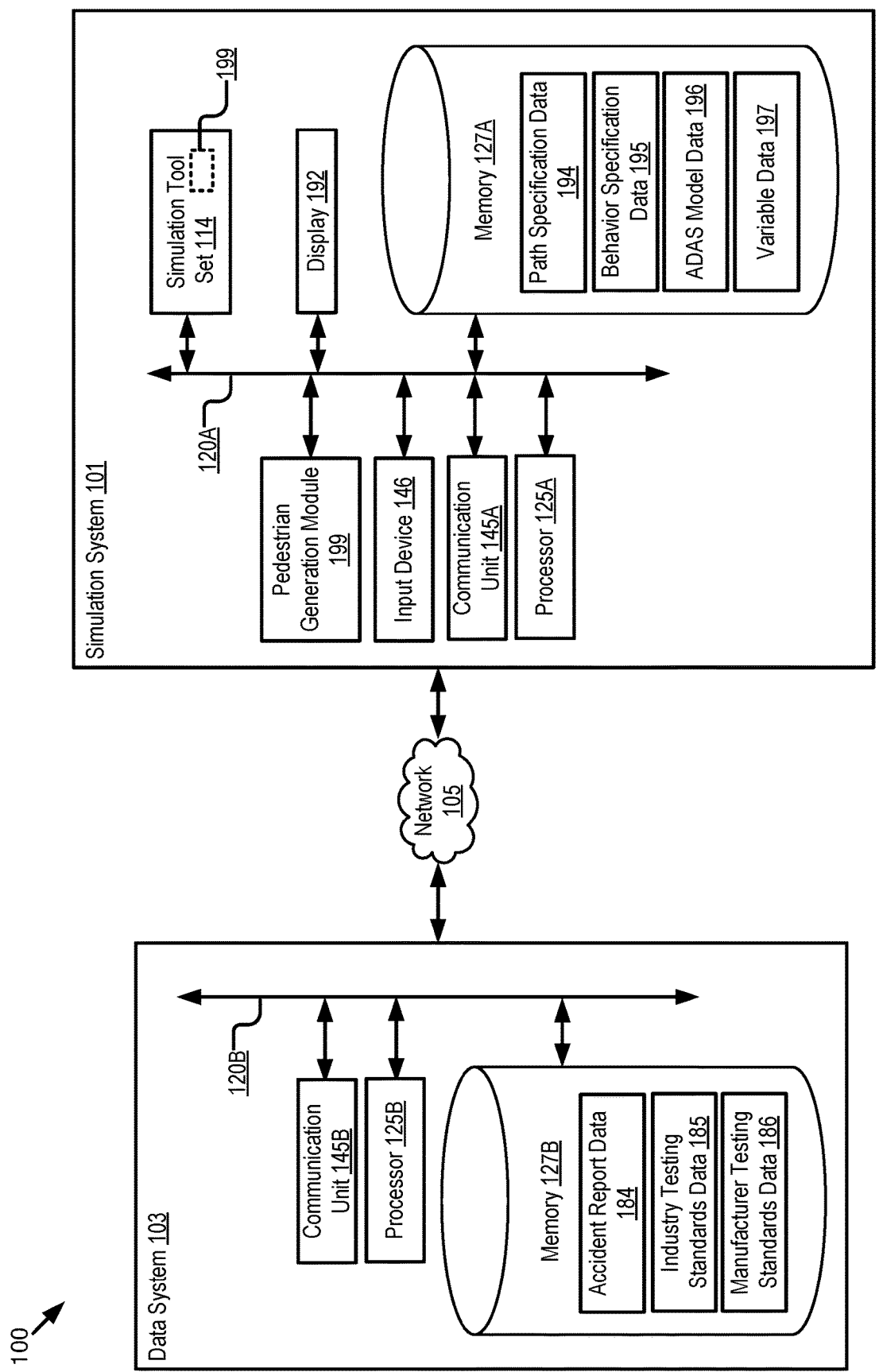
FIG. 1A is a block diagram illustrating an operating environment for a pedestrian generation module according to some embodiments.

Pedestrian safety is an important consideration when designing vehicle ADAS systems. One area of particular concern is pedestrian safety at intersections. This is true because, although pedestrian crosswalks makeup a small percentage of U.S. roadway infrastructure, they are correlated with more than 20% of all pedestrian deaths caused by vehicle collisions.

ADAS systems that protect pedestrians who are present at roadway intersections are becoming increasingly popular. Examples of such ADAS systems include (1) a pre-collision system and (2) a right-turn collision prevention system. Currently, ADAS systems that protect pedestrians who are present at roadway intersections are rigorously tested using real-world tests that are designed to confirm that their functionality conforms to their design as well as industry and manufacturer standards. However, real-world testing is undesirable because it is expensive, time consuming and, therefore, difficult to scale.

Vehicle manufacturers would like to be able to test such ADAS systems using simulation tools such as CarSim or Prescan instead of relying on real-world road testing (i.e., virtualized testing instead of real-world testing). This virtualized approach is preferable because it would enable more tests to be completed (e.g., 100×, or even 1000× more tests) in less time and at a lower cost when compared to real-world testing. As a result of the reduced cost and time, virtualized testing is easy to scale when compared to real-world testing.

One important obstacle to using simulation tools to test the performance of ADAS systems in protecting pedestrians at intersections is the amount of time it takes for design engineers to manually program the simulation tool to create dozens or hundreds of unique and realistic virtual pedestrians for inclusion in the virtualized testing. Currently this is done in an ad-hoc fashion, and is very time consuming.

A second important obstacle is that, based on our experience, we know that such manual, ad-hoc generation of virtual pedestrians is unlikely to generate realistic virtual pedestrians or conform to testing standards which are defined by manufacturers (e.g., Toyota) and international standards (e.g., IEEE). If the virtual pedestrians are not realistic or do not conform to testing standards, then the virtualized testing is invalid and of little use.

Described herein are embodiments of a pedestrian generation module that solve these problems by automatically generating virtual pedestrians for inclusion in the virtualized testing of the performance of ADAS systems to protect pedestrians at intersections using one or more digital simulations. In some embodiments, when the pedestrian generation module is initialized by users (e.g., design engineers) with appropriate variables selected from applicable industry or manufacturer testing standards, the virtual pedestrians created by the pedestrian generation module are guaranteed to be realistic and conform to industry and manufacturer testing standards.

In some embodiments, the pedestrian generation module is a standalone simulation tool. In some embodiments, the pedestrian generation module is a plugin for an existing simulation tool such as CarSim or Prescan.

There is no existing solution which automatically generates virtual pedestrians for inclusion in virtualized tests which measure the performance of ADAS systems when attempting to protect pedestrians at intersections. An advantage of the pedestrian generation module, and improvement relative to existing solutions, is the ability of the pedestrian generation module to realistically generate descriptions of pedestrian walking paths and pedestrian behavior based on a path specification and a behavior specification. The path specification (see, e.g., FIGS. 4A-4C, 10 and 11A-11C) and the behavior specification (see, e.g., FIGS. 5A, 5B and 10) are generated by the pedestrian generation module at a design time (see, e.g., FIG. 1B) using digital data that describes accident reports, industry testing standards and manufacturer testing standards. These descriptions of pedestrian walking paths and pedestrian behavior allow our invention to automatically generate many different unique and realistic virtual pedestrians, each having their own unique behavior, thereby reducing the time and cost required for design engineers or other users to manually generate virtual pedestrians in an ad hoc fashion, or the time and cost required for real-world testing (e.g., road testing).

An additional benefit of the pedestrian generation module is that the pedestrian generation module guarantees that the virtual pedestrians it generates behave realistically (as measured against real-world accident reports) and conform to both manufacturer testing standards and international testing standards. This is because the path specification and the behavior specification are generated by the pedestrian generation module using digital data that describes accident reports, industry testing standards and manufacturer testing standards. No other existing solution, whether based on automatic or manual generation of virtual pedestrians, can provide a similar guarantee of both realism and conformance with both industry and manufacturer testing standards.

Example embodiments of digital simulations for virtually testing a vehicle design are described in U.S. patent application Ser. No. 15/053,945 filed on Feb. 25, 2016 and entitled "Graphical User Interface System for Displaying a Parametric Modification of a Vehicle Model," the entirety of which is herein incorporated by reference.

In some embodiments, the pedestrian generation module may include, or be an element of, one or more Modelica-based modeling tools. In some embodiments, the modeling tools may include a parametric exploration tool ("PET") and a design space exploration ("DSE") tool. Example modeling tools may include one or more of the following modeling tools: Dymola developed by Dassault Systemes AB of Sweden; OpenMETA developed by Vanderbilt University; Simulink developed by MathWorks of Natick, Mass.; and ADAMS developed by MSC Software Corp. of Newport Beach Calif. The pedestrian generation module may use one or more of these modeling tools to generate a digital model that represents a particular vehicle model that includes an ADAS system.

In some embodiments, the pedestrian generation module may also include a game engine such as the Unity™ game engine developed by Unity Technologies of San Francisco, Calif., or some other game engine. The pedestrian generation module may use the game engine to run one or more simulations for measuring the performance of the ADAS system represented by the digital model generated by the one or more modeling tools.

Figure 8:
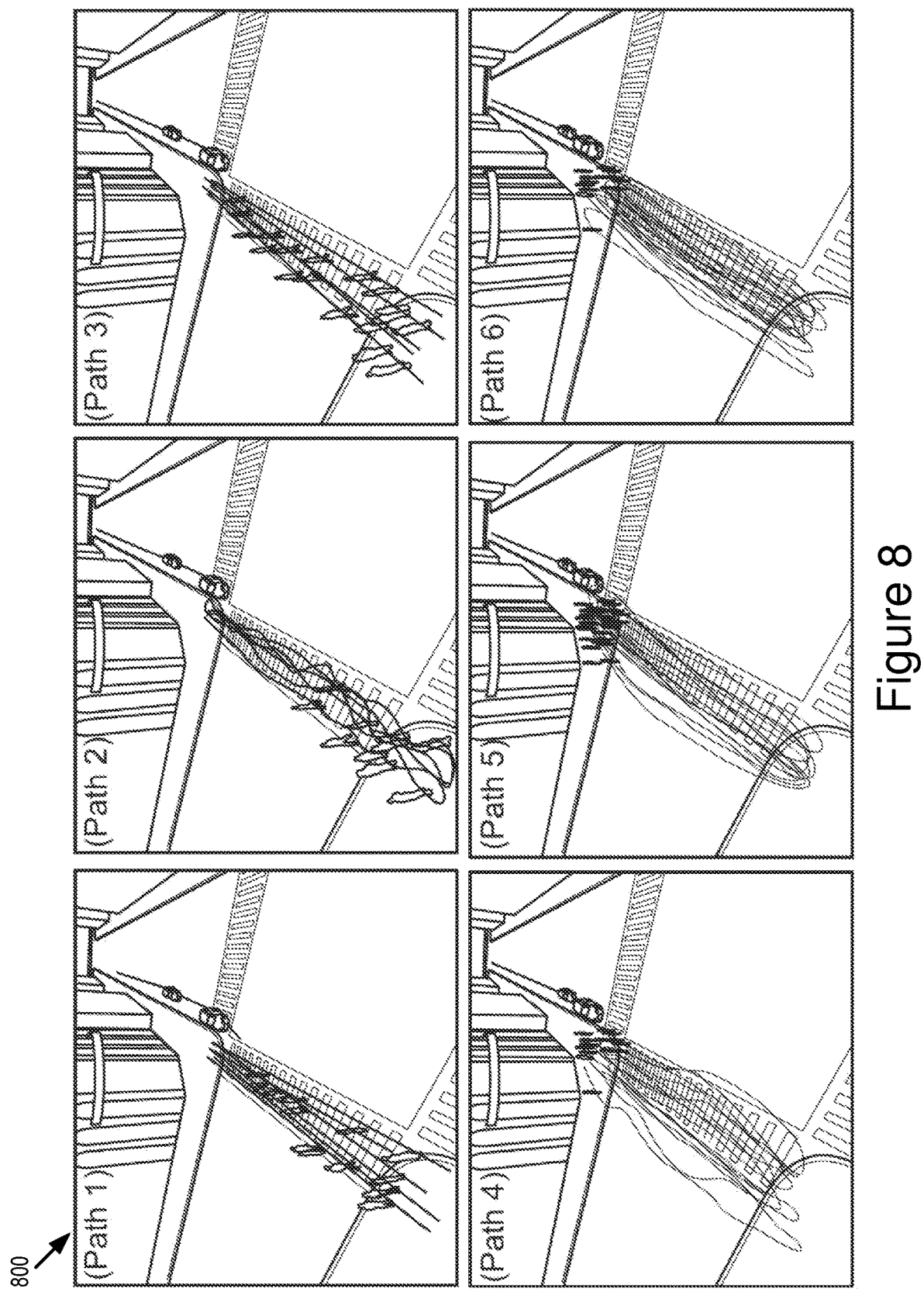
FIG. 8 is a block diagram illustrating a first visualization according to some embodiments.

In some embodiments, the pedestrian generation module may use one or more modeling tools and the game engine to determine a first visualization and a second visualization, examples of which are depicted in FIGS. 8 and 9, respectively.

Referring now to FIG. 1A, depicted is a block diagram illustrating an operating environment 100 for a pedestrian generation module according to some embodiments. The operating environment 100 includes: a simulation system 101; and a data system 103. These elements may be communicatively coupled to a network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, etc. The network 105 may also include a mobile data network that may include third-generation (3G), fourth-generation (4G), long-term evolution (LTE), Voice-over-LTE ("VoLTE"), fifth generation (5G) or any other mobile data network or combination of mobile data networks, or derivative thereof. Further, the network 105 may include one or more IEEE 802.11 wireless networks.

The simulation system 101 is a processor-based computing device. The simulation system 101 includes one or more of the following elements: a communication unit 145A; a processor 125A; a memory 127A; an input device 146; a display 192; a simulation tool set 114 and a pedestrian generation module 199. These elements may be communicatively coupled to one another via a bus 120A.

The data system 103 is a processor-based computing device. The data system 103 includes one or more of the following elements: a communication unit 145B; a processor 125B; and a memory 127B. These elements may be communicatively coupled to one another via a bus 120B.

The communication unit 145A of the simulation system 101 and the communication unit 145B of the data system 103 include similar functionality, and are referred to herein collectively or individually as the "communication unit 145." The processor 125A of the simulation system 101 and the processor 125B of the data system 103 include similar functionality, and are referred to herein collectively or individually as the "processor 125." The memory 127A of the simulation system 101 and the memory 127B of the data system 103 include similar functionality, and are referred to herein collectively or individually as the "memory 127."

The communication unit 145 may include hardware that transmits and receives data to and from the network 105. In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including IEEE 802.11, IEEE 802.16, Bluetooth, or another suitable wireless communication method.

In some embodiments, the communication unit 145 includes a port for direct physical connection to the network 105 or to another communication channel. For example, the communication unit 145 includes a USB, SD, CAT-5, or similar port for wired communication with the network 105.

In some embodiments, the communication unit 145 includes a wireless transceiver for exchanging data with the network 105 or other communication channels using one or more wireless communication methods, including: IEEE 802.11; IEEE 802.16, Bluetooth; or another suitable wireless communication method.

In some embodiments, the communication unit 145 may include a dull-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, etc.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125, multiple processors may be included. The processor 125 may include a graphical processing unit. Other processors, operating systems, sensors, displays, and physical configurations may be possible.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As depicted in FIG. 1, the memory 127 of the simulation system 101 stores one or more of the following types of digital data: path specification data 194; behavior specification data 195; ADAS model data 196; and variable data 197.

The path specification data 194 is digital data that describes a path constraint of a virtual pedestrian within a digital simulation. The digital simulation is generated by the simulation tool set 114. The digital simulation includes a virtual vehicle and a virtualized roadway environment. The virtualized roadway environment includes an intersection. The intersection may include a crosswalk that is usable, for example, by the virtual pedestrian to cross the intersection from one side of a virtualized roadway to the other side of the virtualized roadway. The virtual vehicle includes a virtual ADAS system. The virtual ADAS system is designed to protect the virtual pedestrian. For example, the virtual ADAS system is designed to: (1) detect a presence of the virtual pedestrian while crossing the crosswalk; and (2) responsive to detecting the presence of the virtual pedestrian crossing the crosswalk, control the operation of the virtual vehicle so that the virtual vehicle does not hit or encroach upon the virtual pedestrian, or the area proximate to the virtual pedestrian, as the virtual pedestrian is crossing the intersection. The digital simulation is operable to measure a performance of the virtual ADAS system to protect the virtual pedestrian when responding to the presence of the virtual pedestrian crossing the intersection. The path specification data 194 describes the path of travel that the virtual pedestrian takes while crossing the intersection.

In some embodiments, the path of travel that the virtual pedestrian takes while crossing the intersection is not straight. For example, the virtual pedestrian changes their direction of travel one or more times while crossing the intersection. This may include, for example, the virtual pedestrian walking along one vector for a first distance, and then changing to walk along a different vector for a second distance, and then changing to walk along a third vector for a third distance, and etc., until the virtual pedestrian reaches the other side of the intersection. In this example, the pedestrian begins at a start region at a first curb on a first side of the intersection and ends at an end region at a second curb on the second side of the intersection. See, e.g., FIG. 4B for an example of a start region and an end region. The dotted lines represent the path of travel for different virtual pedestrians. Not that the paths of travel change in direction while crossing the intersection. In some embodiments, the path specification data 194 describes these paths of travel.

In some embodiments, the path specification data 194 does not describe a virtual pedestrian's path of travel as a series of geographical coordinates [i.e., (x1, y1), (x2, y2), . . . (xn, yn) positions] while crossing an intersection. Instead, the path specification data 194 describes the virtual pedestrian's path of travel as a higher level path constraint over a particular geographical region. For example, the path specification data 194 describes one or more of the following path constraints: (1) how often the virtual pedestrian changes its direction while crossing the intersection; (2) a distance traveled by the virtual pedestrian between two successive directional changes while crossing the intersection; (3) a start region for the virtual pedestrian to begin their crossing of the intersection and an end region for the virtual pedestrian to end their crossing of the intersection; and (4) a crosswalk area at the intersection where the virtual pedestrian crosses the intersection, wherein the crosswalk area includes a crosswalk and area proximate to the crosswalk where the virtual pedestrian crosses the intersection to model illegal behavior (e.g., walking outside of the crosswalk). In some embodiments, these path constraints can express complex path patterns with a formula, such as a Satisfiability Modula Theory ("SMT") formula, while allowing the pedestrian generation module 199 to automatically generate many different paths for virtual pedestrians to travel.

In some embodiments, the digital data included in the path specification data 194 is referred to herein as a "path specification."

In some embodiments the path specification includes one or more variables. The variables of the path specification are initialized by the pedestrian generation module 199 using digital data taken from data sources including one or more of the following: the accident report data 184; the industry testing standards data 185; and the manufacturer testing standards data 186. For example, the path specification is operable to accept variables taken from these data sources. See, e.g., FIG. 1B. The path specification is described in more detail below with reference to FIGS. 1B, 1C, 4A, 4B and 4C.

The behavior specification data 195 is digital data that describes how the virtual pedestrian reacts to an event within the digital simulation. For example, the behavior specification data 195 describes how the virtual pedestrian increases their speed of walking as a crosswalk timer gets closer to zero, or how the virtual pedestrian modifies their speed or direction of travel responsive to a virtual vehicle approaching them (e.g., increasing their speed of travel while darting in some direction that is away from the approaching virtual vehicle).

Figure 5A:
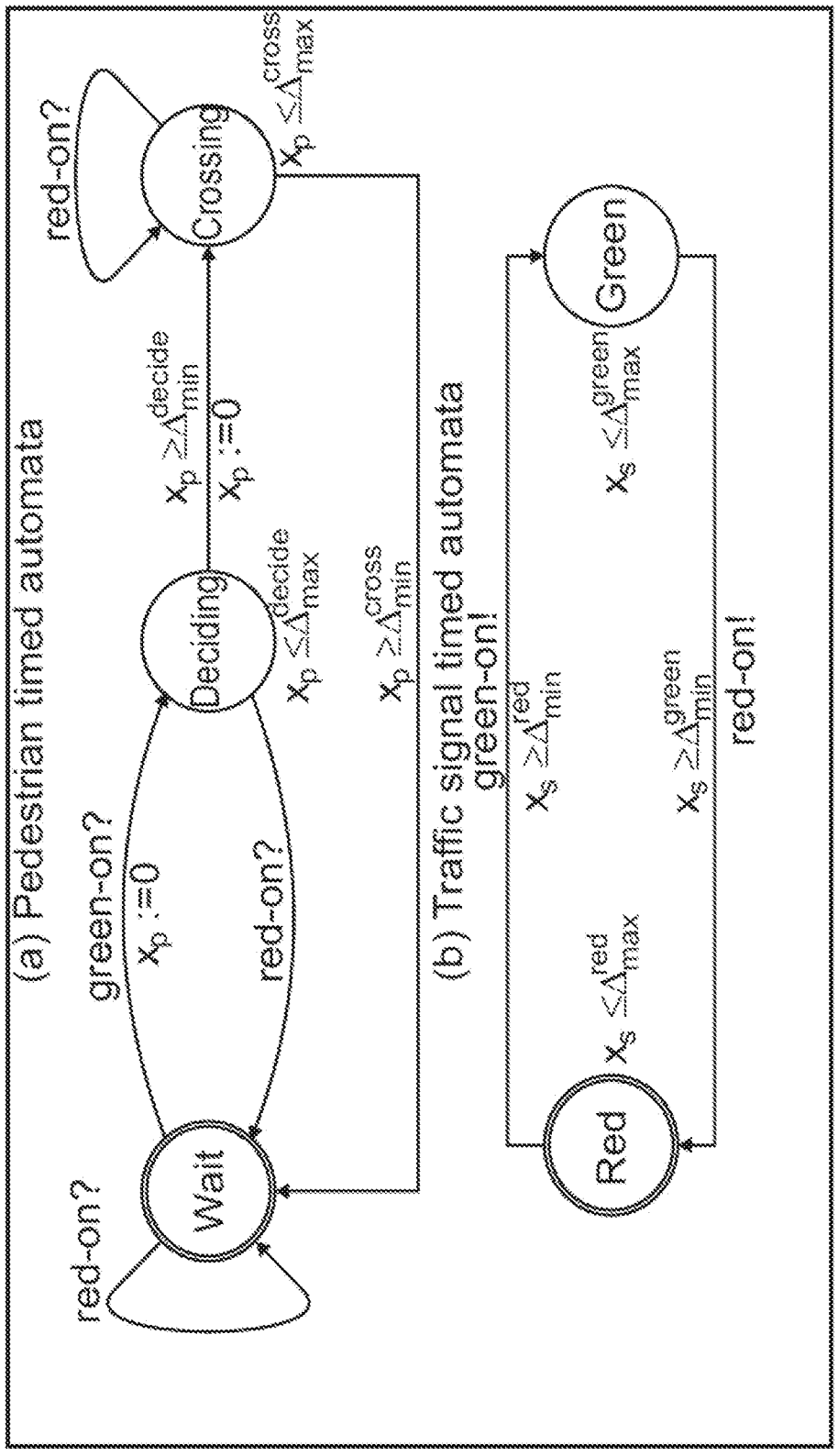
FIG. 5A is a block diagram illustrating a behavior specification according to some embodiments.

In some embodiments, the behavior specification data 195 describes how the virtual pedestrian responds to events using one or more timed automata. The one or more timed automata describe how the virtual pedestrian reacts to an event within the digital simulation as time changes within the digital simulation. Examples of suitable timed automata that are described by the behavior specification data 195 according to some embodiments are depicted in FIG. 5A.

In some embodiments, the behavior specification data 195 describes one or more of the following events: how long the virtual pedestrian will wait for crossing the intersection once a traffic light changes from red to green; and how the virtual pedestrian modifies its walking speed as the traffic light is about to change from green to red. Other examples are possible.

In some embodiments, the digital data included in the behavior specification data 195 is referred to herein as a "behavior specification."

In some embodiments the behavior specification includes one or more variables. The variables of the behavior specification are initialized by the pedestrian generation module 199 using digital data taken from data sources including one or more of the following: the accident report data 184; the industry testing standards data 185; and the manufacturer testing standards data 186. For example, the behavior specification is operable to accept variables taken from these data sources. See, e.g., FIG. 1B. The behavior specification is described in more detail below with reference to FIGS. 1B, 1C, 5A and 5B.

The ADAS model data 196 is digital data that describes a design of a real-world ADAS system that is intended to protect pedestrians who are crossing an intersection. The digital simulation is operable to test the performance of this design to protect virtual pedestrians who are crossing an intersection of a virtual roadway environment within the digital simulation. The virtual roadway environment also includes a virtual vehicle. In some embodiments, the memory also stores vehicle model data that describes the design of the virtual vehicle. In some embodiments, the ADAS model data 196 is an element of the vehicle model data.

In some embodiments, the ADAS model data 196 (and, optionally, the vehicle model data) includes any digital data and information that is necessary for the simulation tool set 114 to generate a digital simulation that includes a virtual vehicle whose design includes a virtualized version of the ADAS system described by the ADAS model data 196. In this way the ADAS model data 196 describes a virtualized version of the ADAS system whose design is described by the ADAS model data 196 (i.e., a "virtual ADAS system"). Within the digital simulation the operation of the virtual vehicle is controlled, at least in part, by the virtual ADAS system when the virtual vehicle detects a presence of a virtual pedestrian crossing an intersection in the virtual roadway environment. For example, the virtual ADAS system automatically engages the braking system of the virtual vehicle so that the virtual vehicle does not collide with the virtual pedestrian or encroach upon the area proximate to the virtual pedestrian. In another example, the virtual ADAS system provides a notification to a virtualized driver of the virtual vehicle that is intended to cause the driver to engage the braking system of the virtual vehicle. In yet another example, the virtual ADAS system automatically causes the virtual vehicle to steered in a direction that is away from the virtual pedestrian or the trajectory of the virtual pedestrian. In this way the virtual ADAS system described by the ADAS model data 196 responds to the virtual pedestrian crossing the intersection. In some embodiments, the pedestrian generation module 199 monitors this response, captures images of the response (see, e.g., FIG. 8) and assesses the quality of the response (see, e.g., FIG. 9). In some embodiments, the quality of the response of the virtual ADAS system is assessed relative to a specification for the design of the ADAS system.

Figure 7:
FIG. 7 is a block diagram illustrating an input visualization for inputting variables for a behavior specification according to some embodiments.

The variable data 197 is digital data that describes one or more variables that are inputted by a user of the simulation system 101. The variable data 197 is inputted using the input device 146 and one or more input visualizations (e.g., one or more graphical user interfaces) that are displayed on the display 192. Examples of input visualizations are depicted in FIGS. 6 and 7. FIG. 6 depicts input fields for the path specification so that the user can input variables which then stored in the memory 127 as variable data 197 and incorporated into the path specification. FIG. 7 depicts input fields for the behavior specification so that the user can input variables which then stored in the memory 127 as variable data 197 and incorporated into the behavior specification. In some embodiments, the input visualizations of FIGS. 6 and 7 are combined to form a single input visualization so that variables for the path specification and the behavior specification are inputted into a single input visualization.

In some embodiments, the variables described by the variable data 197 include one or more of the following for the path specification: which path specification to use during set of digital simulations (each path specification is extracted from one or more data sources including such as the accident report data 184, the industry testing standards data 185 and the manufacturer testing standards data 186); a number of direction changes for a virtual pedestrian to make while crossing the intersection; the distance between two adjacent direction changes (this may be defined as a minimum distance and a maximum distance so that a particular virtual pedestrian walks different distances between different direction changes); the margin size; and the number of paths. See, e.g., FIG. 6.

In some embodiments, the variables described by the variable data 197 include one or more of the following for the behavior specification: which behavior specification to use during set of digital simulations (each behavior specification is extracted from one or more data sources including such as the accident report data 184, the industry testing standards data 185 and the manufacturer testing standards data 186); whether the virtual pedestrian will break a legal rule pertaining to crossing an intersection (e.g., jaywalking, walking outside of a crosswalk, etc.); the minimum waiting time before beginning to cross the intersection after a traffic signal indicates that it is legal to cross the intersection; the maximum waiting time before beginning to cross the intersection after a traffic signal indicates that it is legal to cross the intersection; and whether a particular virtual pedestrian will finish crossing the intersection before a traffic signal indicates that it is no longer legal to cross the intersection. See, e.g., FIG. 7.

Example embodiments of the variable data 197 are described in more detail below with reference to FIGS. 10 and 11A-11C. For example, the coverage criteria described below with reference to FIGS. 11A-11C include variables which are defined by the variable data 197.

In some embodiments, the memory 127 of the simulation system 101 stores the following digital data sources: the accident report data 184; the industry testing standards data 185; and the manufacturer testing standards data 186. Optionally, the pedestrian generation module 199 causes the communication unit 145 of the simulation system 101 to retrieve these digital data sources from one or more data systems 103 via the network 105 according to some embodiments. In some embodiments, these data sources are stored in the memory 127 of the simulation system 101 so that the data system 103 is not needed.

The input device 146 includes any digital input peripheral for a computing device such as the simulation system 101. For example, the input device 146 includes a keyboard, mouse, microphone, touchscreen, camera, or any other digital input peripheral.

The display 192 includes an electronic display device. For example, the display 192 includes a monitor or an electronic display panel.

The simulation tool set 114 includes one or more of the following: a simulation tool; and game engine. Examples of suitable simulation tools that may be included in the simulation tool set 114 are CarSim, Prescan or a Modelica-based modeling tool (described above) according to some embodiments. The Unity game engine is a suitable game engine that may be included in the simulation tool set 114 according to some embodiments.

In some embodiments, one or more of the Modelica-based modeling tools included in the simulation tool set 114 may include one or more parametric exploration tools ("PET" if singular, or "PETs" if plural).

In some embodiments, one or more of the Modelica-based modeling tools included in the simulation tool set 114 may include one or more design space exploration ("DSE") tools.

Example embodiments for generating a digital simulation are described in U.S. patent application Ser. No. 15/013,936 filed on Feb. 2, 2016 and entitled "Realistic Roadway Virtualization System," the entirety of which is herein incorporated by reference.

Additional example embodiments for generating a digital simulation to test a performance of a virtual ADAS system are described in U.S. patent application Ser. No. 15/159,233 filed on May 19, 2016 and entitled "User Profile-Based Automatic Parameter Tuning System for Connected Vehicles," the entirety of which is herein incorporated by reference.

In some embodiments, the pedestrian generation module 199 is an element of the simulation tool set 114. For example, the pedestrian generation module 199 is a plug-in of a simulation tool included in the simulation tool set 114. Accordingly, pedestrian generation module 199 is depicted with a dashed line in FIG. 1A inside of the simulation tool set 114 to indicate that in some embodiments the pedestrian generation module 199 is a plug-in of the simulation tool included in the simulation tool set 114.

Figure 2:
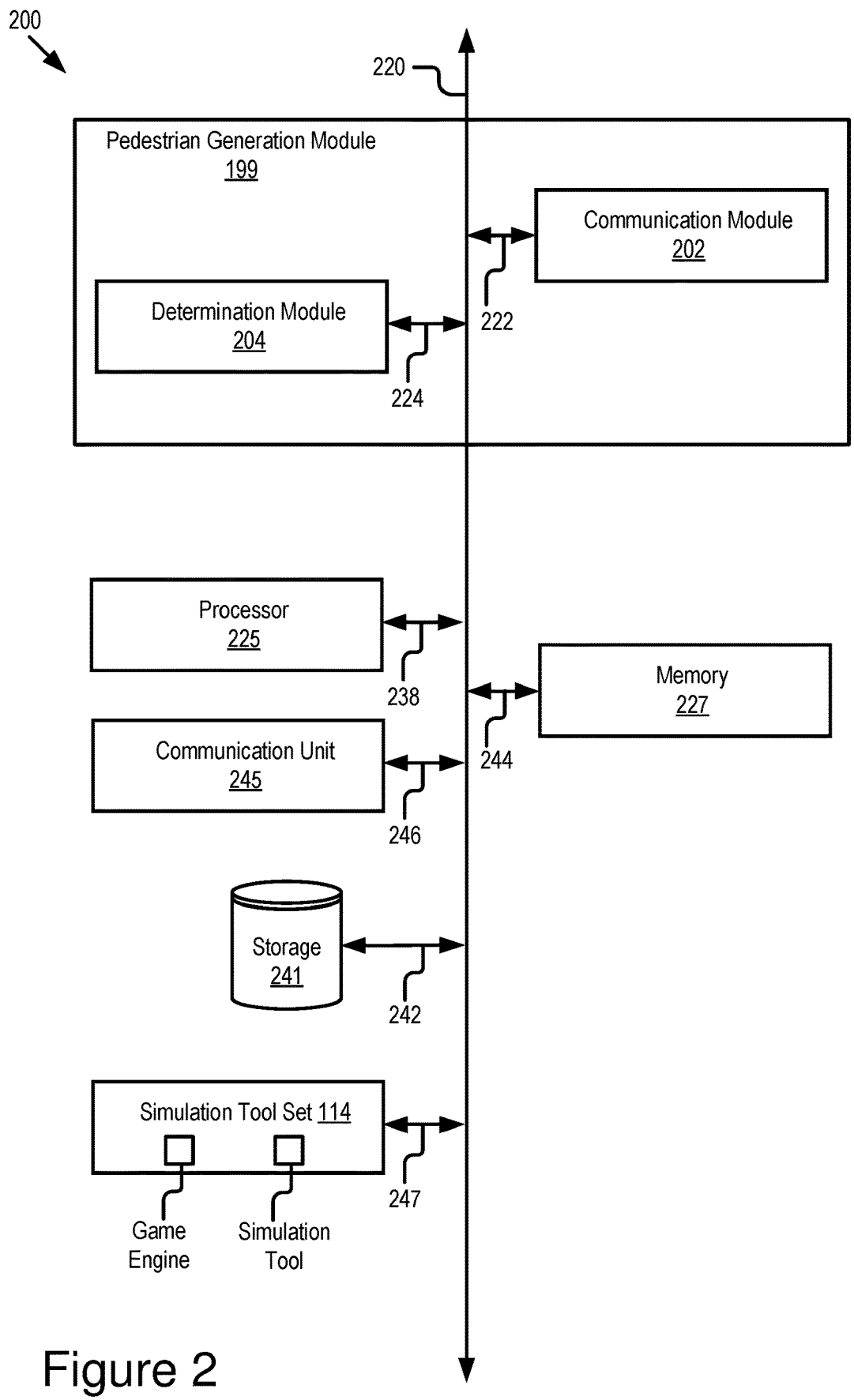
FIG. 2 is a block diagram illustrating an example computer system including a pedestrian generation module according to some embodiments.
Figure 3A:
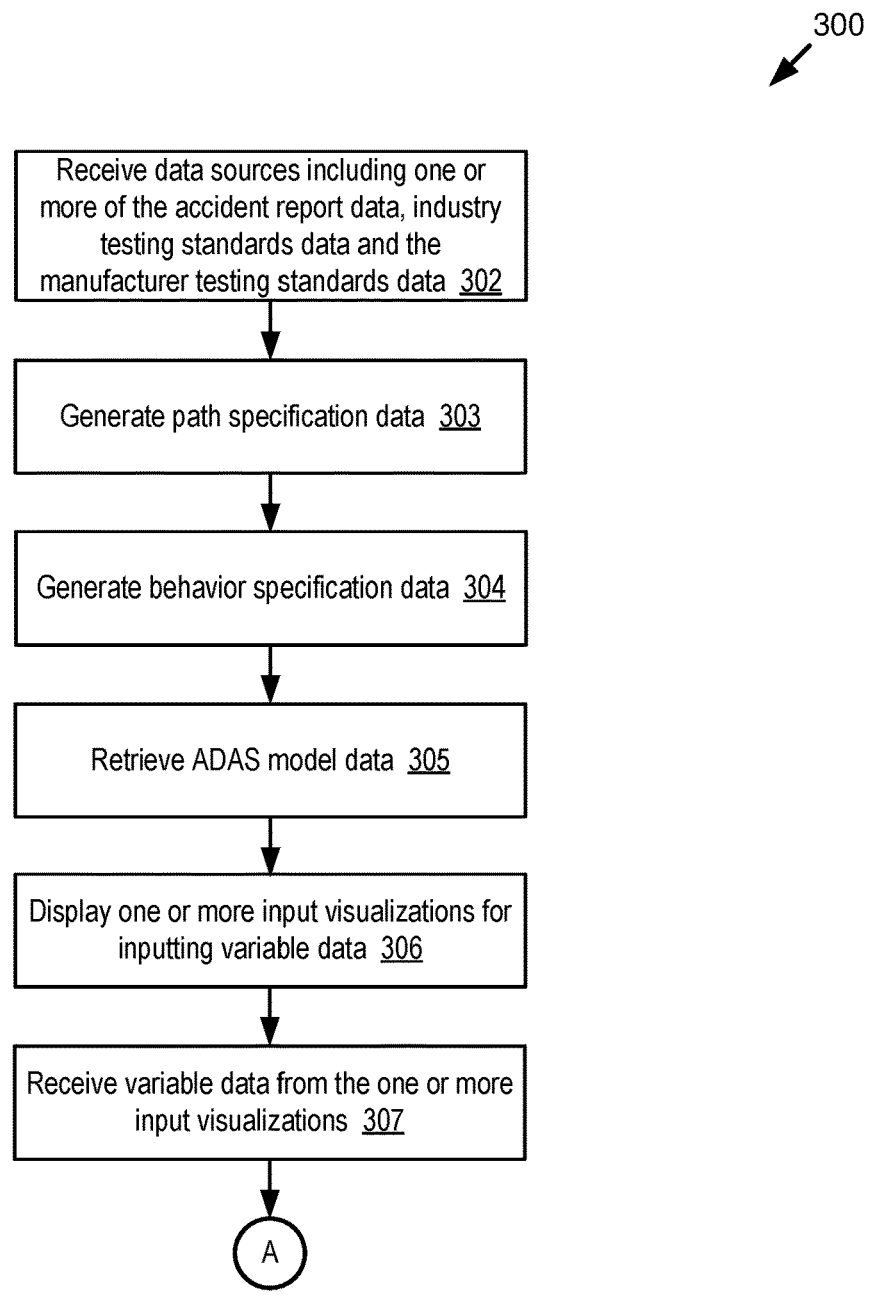
FIGS. 3A-3C are a flowchart of an example method for automatically generating a set of virtual pedestrians for a digital simulation to test a performance of an ADAS system to protect the virtual pedestrians at an intersection according to some embodiments.
Figure 3B:
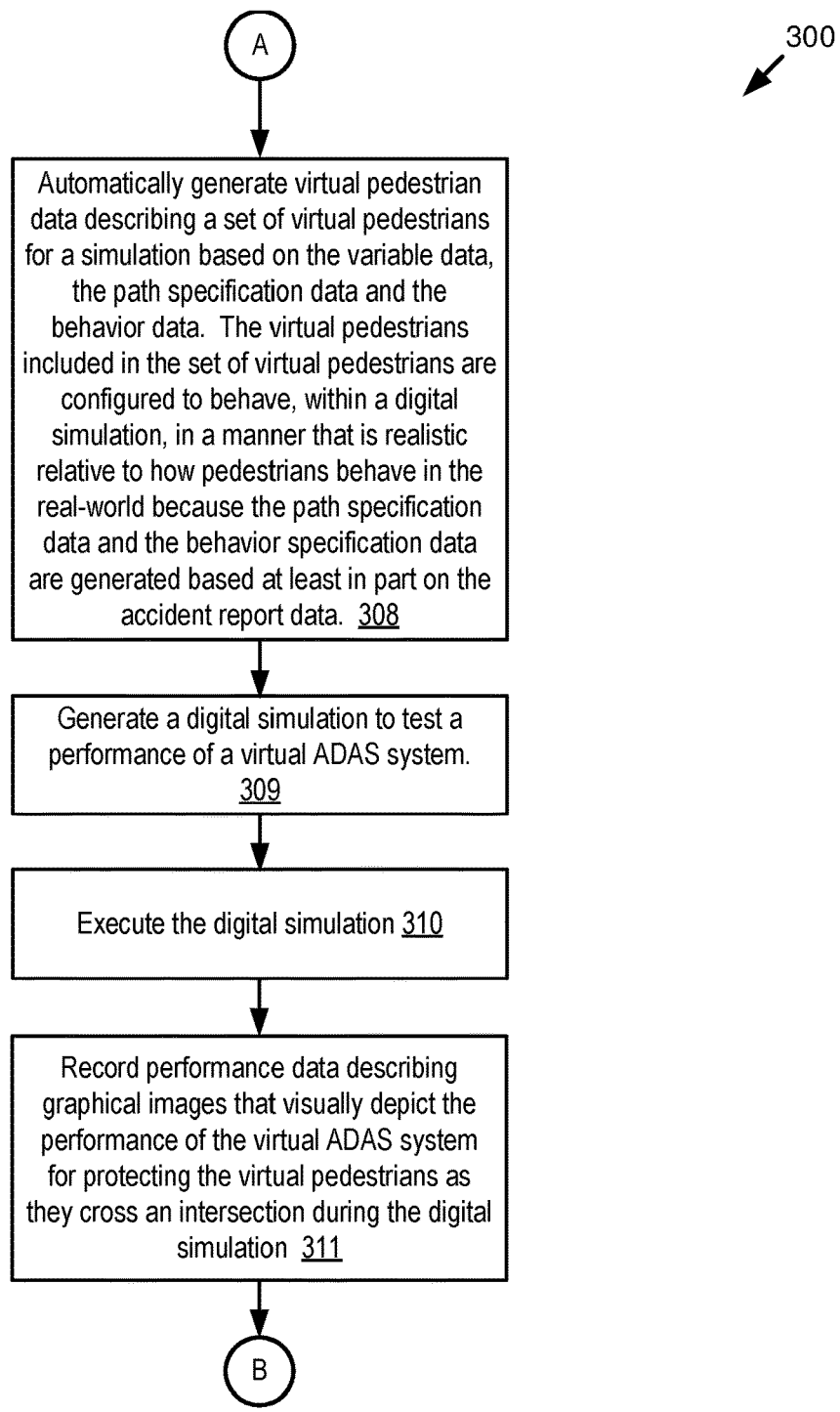
Figure 3C:
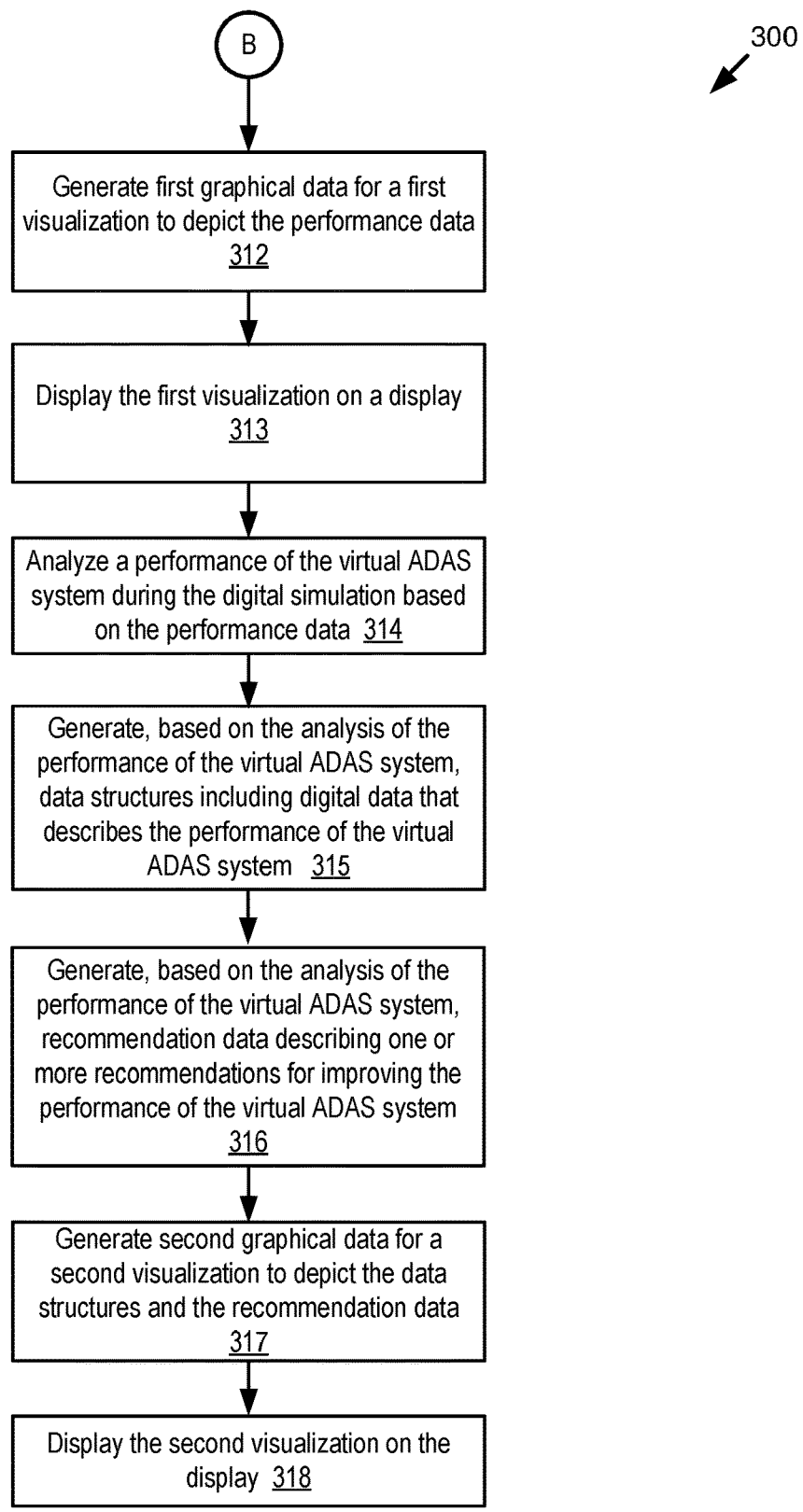

The pedestrian generation module 199 includes code and routines that are operable, when executed by the processor 125 of the simulation system 101, to cause the processor 125 to execute one or more of the steps of the method 300 depicted in FIGS. 3A-3C. The pedestrian generation module 199 includes code and routines that are operable, when executed by the processor 125 of the simulation system 101, to generate one or more virtual pedestrians based on the path specification and the behavior specification. The pedestrian generation module 199 is described in more detail below with reference to FIGS. 1B, 1C, 2 and 3A-3C.

In some embodiments, the pedestrian generation module 199 includes a thin client that is executed by the processor 125 of the simulation system 101.

In some embodiments, the pedestrian generation module 199 is implemented using hardware including a field-programmable gate array ("FPGA") or an application-specific integrated circuit ("ASIC"). In some other embodiments, the pedestrian generation module 199 is implemented using a combination of hardware and software. In some embodiments, the pedestrian generation module 199 is stored in a combination of the devices (e.g., servers or other devices), or in one of the devices.

In some embodiments, the pedestrian generation module 199 may be implemented using hardware including an FPGA or an ASIC. In some other embodiments, the pedestrian generation module 199 may be implemented using a combination of hardware and software. The pedestrian generation module 199 may be stored in a combination of the devices (e.g., servers or other devices), or in one of the devices.

As depicted, the data system 103 includes the following elements: the communication unit 145; the processor 125; and the memory 127. These elements of the data system 103 include similar features and functionality as the communication unit 145, the processor 125 and the memory 127 of the simulation system 101, and so, those descriptions will not be repeated here.

As depicted, the memory 127 of the data system 103 stores the following digital data: accident report data 184; industry testing standards data 185; and manufacturer testing standards data 186.

The accident report data 184 is digital data that describes one or more real-world accident reports that describe a walking path and behavior of one or more real-world pedestrians who were injured by vehicles at one or more real-world roadway intersections.

The industry testing standards data 185 is digital data that describes industry testing standards associated with: testing the performance of ADAS systems; and designing roadway intersections. Examples of such industry testing standards include the following: The European New Car Assessment Programme (Euro NCAP) Pedestrian Testing Protocol; Chapter 6 of the 2006 edition of the Massachusetts Design Handbook, entitled "Intersections"; and the 2015 edition of the Florida Intersection Design Guide.

The manufacturer testing standards data 186 is digital data that describes standards that have been established by one or more automobile manufacturers for testing the performance of ADAS systems for protecting pedestrians at roadway intersections.

Figure 1B:
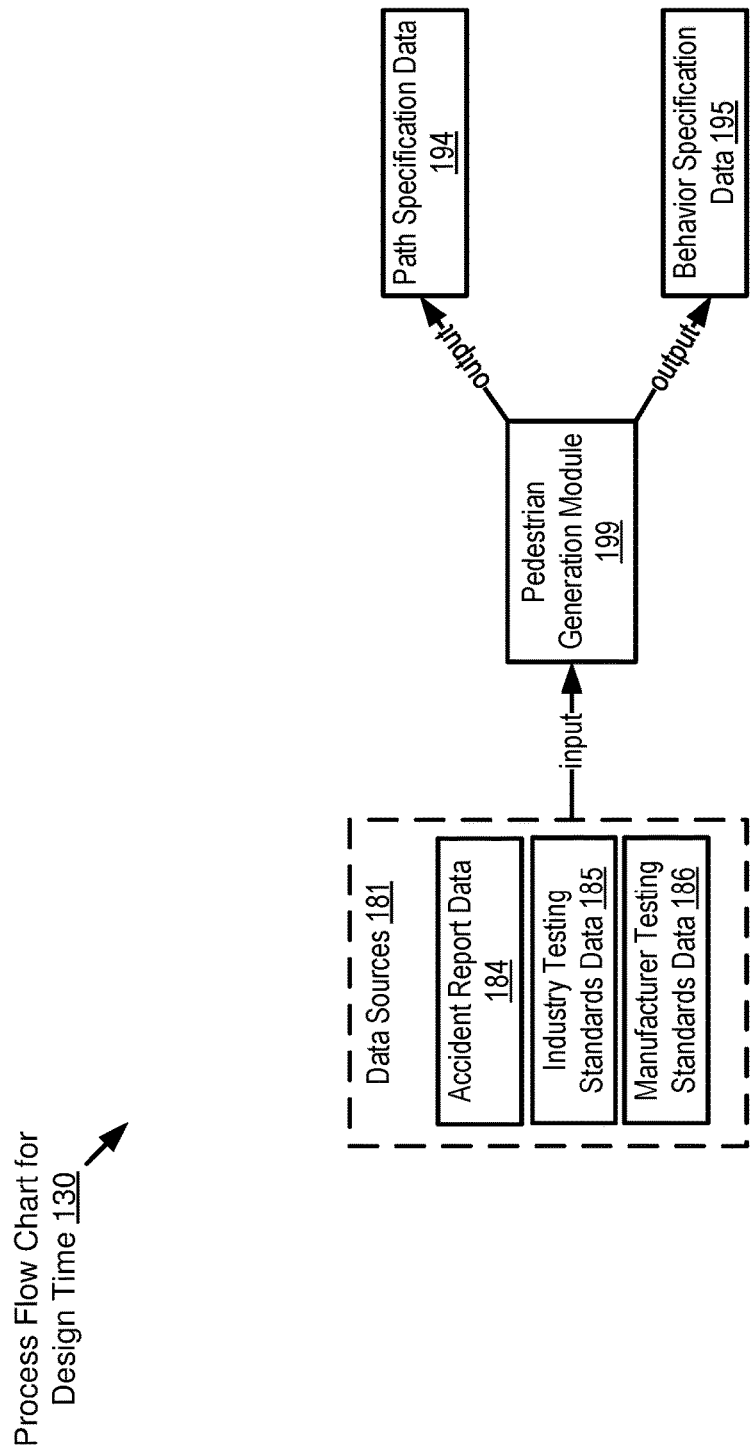
FIG. 1B is a block diagram illustrating a process flow chart executed by the pedestrian generation module at a design time according to some embodiments.

Referring now to FIG. 1B, depicted is a block diagram illustrating a process flow chart 130 executed by the pedestrian generation module 199 at a design time according to some embodiments. The pedestrian generation module 199 receives data sources 181 as an input. The data sources 181 include one or more of the following: the accident report data 184; the industry testing standards data 185; and the manufacturer testing standards data 186. The pedestrian generation module 199 analyzes the data sources 181 and extracts one or more path specifications and one or more behavior specifications from the data sources 181. The pedestrian generation module 199 outputs the path specification data 194 and the behavior specification data 195. The path specification data 194 describes the one or more path specifications. The behavior specification data 195 describes the one or more behavior specifications.

In some embodiments, a path specification includes a plurality of variables. See, e.g., FIG. 4A. These variables of the path specification are initiated using information extracted by the pedestrian generation module 199 from the data sources 181. The behavior specification also includes a plurality of variables. See, e.g., FIG. 5A. These variables of the behavior specification are initiated using information extracted by the pedestrian generation module 199 from the data sources 181. Both the path specification and the behavior specification are not taken from design handbooks or scholarly articles. Instead, the path specification and the behavior specification are extracted from the data sources 181.

Figure 1C:
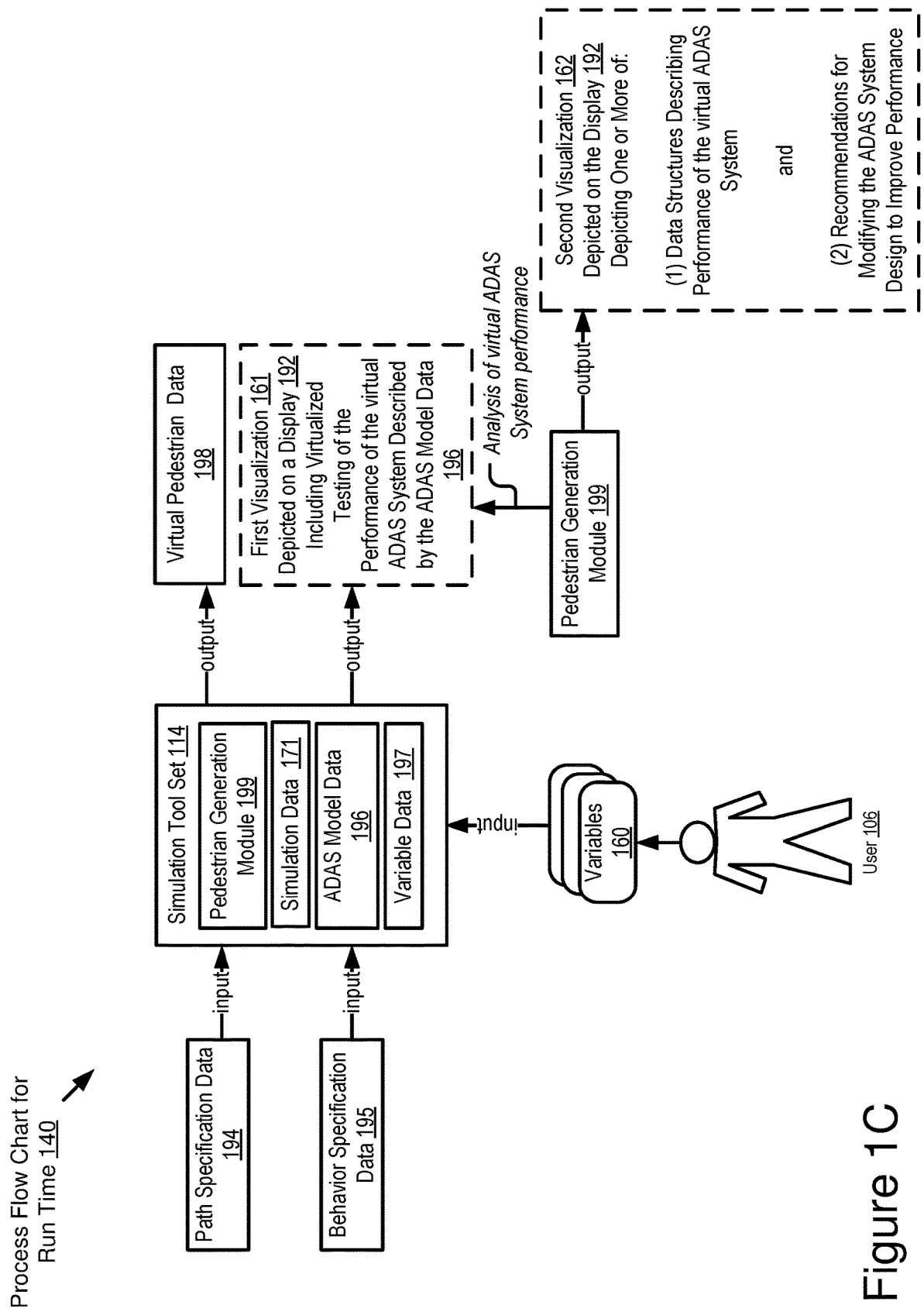
FIG. 1C is a block diagram illustrating a process flow chart executed by the pedestrian generation module at a run time according to some embodiments.

Referring now to FIG. 1C, is a block diagram illustrating a process flow chart 140 executed by the pedestrian generation module 199 at a run time according to some embodiments.

The pedestrian generation module 199 of the simulation tool set 114 receives the following inputs: (1) the path specification data 194; (2) the behavior specification data 195; and (3) the variable data 197. The path specification data 194 and the behavior specification data 195 were determined by the pedestrian generation module 199 at a design time. At run time the pedestrian generation module 199 provides graphical data to the display 192 that causes the display 192 to generate one or more input visualizations which are used by the user 106 to input the variables 160. The variables 160 are described by the variable data 197. Examples of input visualizations (i.e., graphical user interfaces) are depicted in FIGS. 6 and 7. In some embodiments, the input visualizations of FIGS. 6 and 7 are combined so that only one input visualization is needed for the pedestrian generation module 199 to receive the variable data 197 from the user 106.

The pedestrian generation module 199 automatically generates the virtual pedestrian data 198 based on the inputs described above. The virtual pedestrian data 198 describes one or more virtual pedestrians that are generated by the pedestrian generation module 199 based on the path specification data 194, the behavior specification data 195 and the variable data 197. Each of the virtual pedestrians may be generated using a different combination of data (e.g., a different combination of path specification, behavior specification and variable data 197) so that each is unique relative to the other virtual pedestrians. See, e.g., FIGS. 6 and 7. The virtual pedestrian data 198 is stored on the memory 127 of the simulation system 101.

After generating the virtual pedestrian data 198, the simulation tool set 114 executes one or more digital simulations which are designed to test the performance of the virtual ADAS system for protecting the virtual pedestrians when responding to virtual pedestrians crossing intersections included in the one or more digital simulations.

The simulation data 171 is digital data that is operable to cause the simulation tool set 114 to generate one or more digital simulations which are designed to test the performance of the virtual ADAS system for protecting the virtual pedestrians when responding to virtual pedestrians crossing intersections included in the one or more digital simulations. The simulation data 171 includes any data or information that is necessary to cause the simulation tool to generate the digital simulation. For example, the simulation data 171 includes the virtual pedestrian data 198 for generation a set of virtual pedestrians and roadway model data that is digital data that describes a virtual roadway including an intersection and other features such as a traffic signal, a crosswalk and other conventional roadway features such as those depicted in the digital simulation scenes of FIGS. 4B, 5B and 8.

After generating the virtual pedestrian data 198 and execution the one or more digital simulations, the simulation tool set 114 provides graphical data to the display 192 to cause the display 192 to depict a first visualization 161 that visually describes the performance of the virtual ADAS system for protecting the virtual pedestrians when responding to virtual pedestrians crossing intersections included in the one or more digital simulations. An example of a first visualization 161 is depicted in FIG. 8 according to some embodiments.

The memory 127 of the simulation system 101 stores digital data that describes the design specification for the virtual ADAS system. The pedestrian generation module 199 analyzes the performance of the virtual ADAS system for protecting the virtual pedestrians when responding to virtual pedestrians crossing intersections included in the one or more digital simulations. For example, the pedestrian generation module 199 assesses how quickly the virtual vehicle engages its braking system and other variables which indicate whether the virtual ADAS system adequately protected the virtual pedestrians based on the design specification for the ADAS system which is represented by the virtual ADAS system. In this way the pedestrian generation module 199 analyzes the one or more digital simulations to determine whether the virtual ADAS system operated in compliance with its design specification. If the pedestrian generation module 199 determines that the virtual ADAS system did not perform in compliance with its design specification, then the pedestrian generation module 199 determines recommendations for modifying the design of the virtual ADAS system (e.g., the ADAS model data 196) so that the virtual ADAS system will operate in a manner that complies with its design specification.

In some embodiments, the pedestrian generation module 199 outputs graphical data to the display 192 to cause the display 192 to depict a second visualization 162 that visually describes: (1) data structures describing the performance of the virtual ADAS system; and (2) recommendations for modifying the design of the virtual ADAS system. An example of the second visualization 162 is depicted in FIG. 9 according to some embodiments which do not include the a visual depiction of recommendations for modifying the design of the virtual ADAS system.

Referring now to FIG. 2, depicted is a block diagram illustrating an example computer system 200 including a pedestrian generation module 199 according to some embodiments.

In some embodiments, the computer system 200 may include a special-purpose computer system that is programmed to perform one or more steps of a method 300 described below with reference to FIGS. 3A-3C.

In some embodiments, the computer system 200 may include the simulation system 101.

The computer system 200 may include one or more of the following elements according to some examples: the pedestrian generation module 199; a processor 225; a communication unit 245; a storage 241; a simulation tool set 114; and a memory 227. The components of the computer system 200 are communicatively coupled by a bus 220.

In the illustrated embodiment, the processor 225 is communicatively coupled to the bus 220 via a signal line 238. The communication unit 245 is communicatively coupled to the bus 220 via a signal line 246. The simulation tool set 114 is communicatively coupled to the bus 220 via a signal line 247. The storage 241 is communicatively coupled to the bus 220 via a signal line 242. The memory 227 is communicatively coupled to the bus 220 via a signal line 244.

The simulation tool set 114 was described above with reference to FIG. 1A, and so, that description will not be repeated here.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a DRAM device, a SRAM device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The memory 227 stores any of the digital data described herein. In some embodiments, the memory 227 stores any digital data or information that is necessary for the pedestrian generation module 199 and the simulation tool set 114 to provide their functionality.

The communication unit 245 may include hardware that transmits and receives data to and from the network 105. In some embodiments, the communication unit 245 includes a port for direct physical connection to the network 105 or to another communication channel. For example, the communication unit 245 includes a USB, SD, CAT-5, or similar port for wired communication with the network 105. In some embodiments, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some embodiments, the communication unit 245 includes a port for direct physical connection to the network 105 or to another communication channel. For example, the communication unit 245 includes a USB, SD, CAT-5, or similar port for wired communication with the network 105.

In some embodiments, the communication unit 245 includes a wireless transceiver for exchanging data with the network 105 or other communication channels using one or more wireless communication methods, including: IEEE 802.11; IEEE 802.16, Bluetooth; or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In some embodiments, the storage 241 operates as a buffer or short-term storage.

In the illustrated embodiment shown in FIG. 2, the pedestrian generation module 199 includes a communication module 202 and a determination module 204. These components of the pedestrian generation module 199 are communicatively coupled to each other via the bus 220. In some embodiments, components of the pedestrian generation module 199 can be stored in a single server or device. In some other embodiments, components of the pedestrian generation module 199 can be distributed and stored across multiple servers or devices.

The communication module 202 can be software including routines for handling communications between the pedestrian generation module 199 and other components of the computer system 200. In some embodiments, the communication module 202 can be a set of instructions executable by the processor 225 to provide the functionality described below for handling communications between the pedestrian generation module 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, one or more of the following: the accident report data 184; the industry testing standards data 185; and the manufacturer testing standards data 186.

In some embodiments, the communication module 202 receives data from components of the pedestrian generation module 199 and stores the data in one or more of the storage 241 and the memory 227. For example, the communication module 202 receives the path specification data 194 and the behavior specification data 195 from the determination module 204 and stores the path specification data 194 and the behavior specification data 195 in the memory 227.

In some embodiments, the communication module 202 may handle communications between components of the pedestrian generation module 199 or the computer system 200.

In some embodiments, the communication module 202 can be stored in the memory 227 of the computer system 200 and can be accessible and executable by the processor 225.

The determination module 204 can be software including routines for executing one or more steps of the method 300 depicted in FIG. 3A-3C. In some embodiments, the determination module 204 includes code and routines that are operable, when executed by the processor 225, to execute one or more of the process flow chart 130 depicted in FIG. 1B and the process flow chart 140 depicted in FIG. 1C.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Referring now to FIGS. 3A-3C, depicted is a flowchart of an example method 300 for automatically generating a set of virtual pedestrians for a digital simulation to test a performance of an ADAS system to protect the virtual pedestrians at an intersection according to some embodiments.

At step 302, data sources are received. The data sources include one or more of the following: accident report data; industry testing standards data; and the manufacturer testing standards data.

At step 303, the path specification data is generated. For example, the data sources are analyzed to generate one or more path constraints from the accident report data that conform to the industry testing standards and the manufacturer testing standards data.

At step 304, the behavior specification data is generated. For example, the data sources are analyzed to extract the behavior of pedestrians and how they react to events as described by the accident report data. The extracted behaviors are then filtered based on the industry testing standards data and the manufacturer testing standards data to ensure that the behavior specifications described by the behavior specification data conforms to the industry testing standards and the manufacturer testing standards.

At step 305, the ADAS model data is retrieved.

At step 306, one or more input visualizations are displayed.

At step 307, variable data is received from the one or more input variables. The variable data can be inputted into the path specification and the behavior specification.

Referring now to FIG. 3B, virtual pedestrian data is automatically generated at step 308. The virtual pedestrian data describes a set of virtual pedestrians for a simulation based on the variable data, the path specification data and the behavior data. The virtual pedestrians included in the set of virtual pedestrians are configured to behave, within a digital simulation, in a manner that is realistic relative to how pedestrians behave in the real-world because the path specification data and the behavior specification data are generated based at least in part on the accident report data.

At step 309, a digital simulation is generated to test a performance of a virtual ADAS system. The digital simulation may be described by simulation data. The simulation data is digital data that describes a digital roadway environment that includes an intersection and a virtual vehicle that includes the virtual ADAS system described by the ADAS model data. The simulation data is stored in the memory of the simulation system.

At step 310, the digital simulation is executed. The performance of the virtual ADAS system is monitored while the digital simulation is executed. In some embodiments, a plurality of digital simulations are executed and the performance of the virtual ADAS system is monitored for each digital simulation which is executed.

At step 311, performance data is recorded. The performance data is digital data describing graphical images that visually depict the performance of the virtual ADAS system for protecting the virtual pedestrians as they cross an intersection during the digital simulation.

Referring to FIG. 3C, first graphical data for a first visualization is generated at step 312. The first graphical data is digital data that is operable to cause the display to depict the first visualization that depicts the information described by the performance data.

At step 313, the first visualization is displayed on a display.

At step 314, a performance of the virtual ADAS system is analyzed during the digital simulation based on the performance data.

At step 315, one or more data structures are generated based on the analysis of the performance of the virtual ADAS system. The data structures include digital data that describes the performance of the virtual ADAS system. For example, the data structure is a table that includes the digital data that describes the performance of the virtual ADAS system during one or more digital simulations.

At step 316, recommendation data is generated based on the analysis of the performance of the virtual ADAS system. The recommendation data describes one or more recommendations for improving the performance of the virtual ADAS system.

At step 317, second graphical data is generated. The second graphical data is digital data that is operable to cause the display to depict a second visualization that depicts the data structures and the information described by the recommendation data.

At step 318, the second visualization is displayed on the display.

Figure 4A:
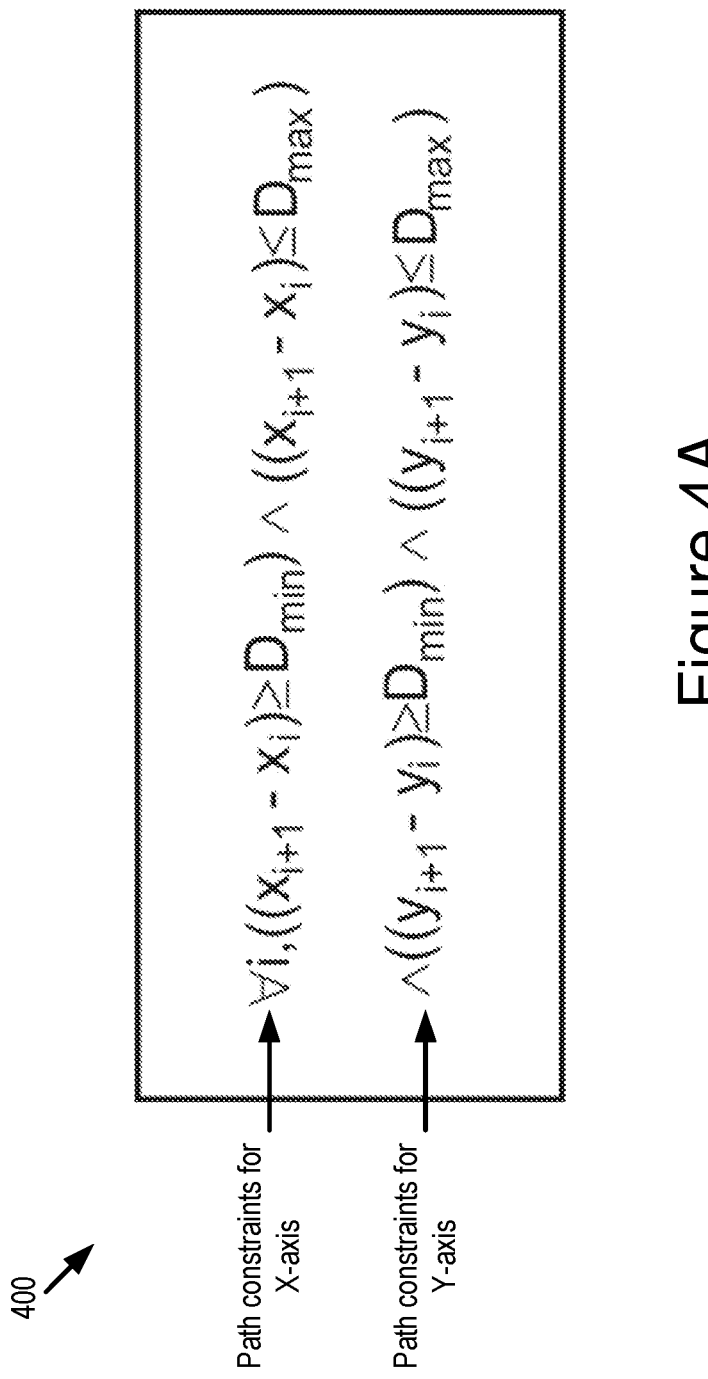
FIG. 4A is a block diagram illustrating an example of a path specification according to some embodiments.
Figure 4B:
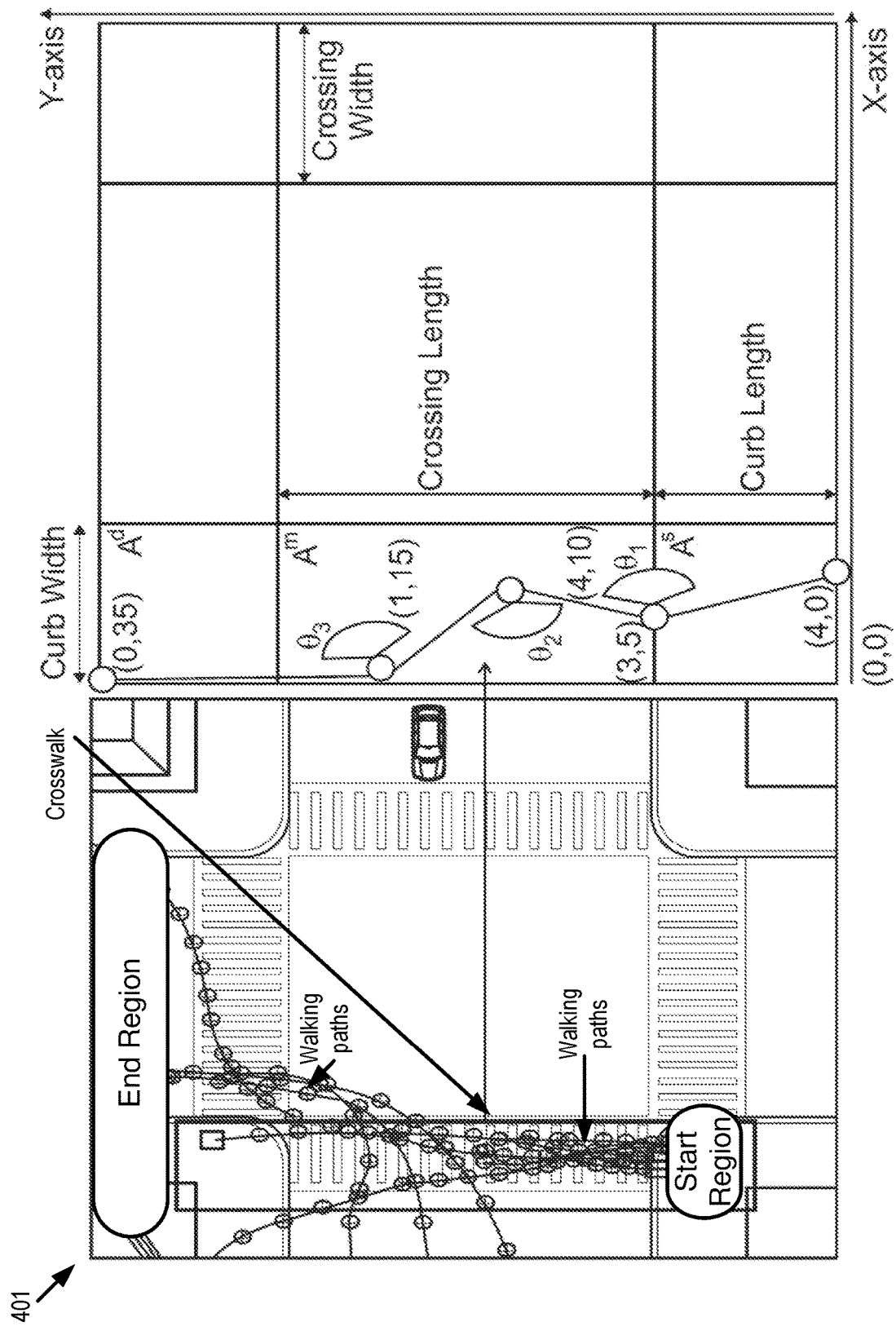
FIG. 4B is a block diagram illustrating an example of an intersection in a digital simulation and variables for the path specification according to some embodiments.

Referring now to FIG. 4A, depicted is a block diagram illustrating an example of a path specification 400 according to some embodiments. Included in the example of the path specification 400 is a path constraint for an X-axis of an intersection and a path constraint for a Y-axis of the intersection. FIGS. 4B and 4C help explain FIG. 4A according to some embodiments. For example, FIG. 4B includes an image of an intersection included in a digital simulation as well as a plurality of walking paths walked by virtual pedestrians during the digital simulation while crossing the intersection. FIG. 4C depicts how the path constraints of FIG. 4A affect the walking paths walked by the virtual pedestrians while crossing the intersection.

Referring now to FIG. 4B, depicted is a block diagram illustrating an example 401 of an intersection in a digital simulation and variables for the path specification according to some embodiments.

Referring now to FIG. 4C, depicted is a block diagram illustrating an example of path specification data 402 that includes defined variables for the path specification according to some embodiments. FIG. 4C shows how the path specification 401 of FIG. 4A applies to the example 401 of FIG. 4B.

Referring now to FIG. 5A, depicted is a block diagram illustrating a behavior specification 500 according to some embodiments. In the depicted embodiment, the behavior specification includes a pair of timed automata: (a) a pedestrian timed automata; and (b) a traffic signal timed automata. Together these automata define how virtual pedestrians behave in response to traffic signals and events within the digital simulation. For example: (1) some virtual pedestrians walk immediately when a traffic signal turns green; (2) some virtual pedestrians are more cautious and walk after a few moments which are used to look and verify that it is safe to walk across the roadway; and (3) some virtual pedestrians actually walk before the traffic signal turns green [e.g., jaywalking, which is an example of an illegal behavior that a virtual pedestrian generated by the pedestrian generation module may engage in]. In this way the behavior specification is useful for generating virtual pedestrians whose behavior is realistic based on one or more variables taken from the accident report data 184, as well as other data sources 181.

Figure 5B:
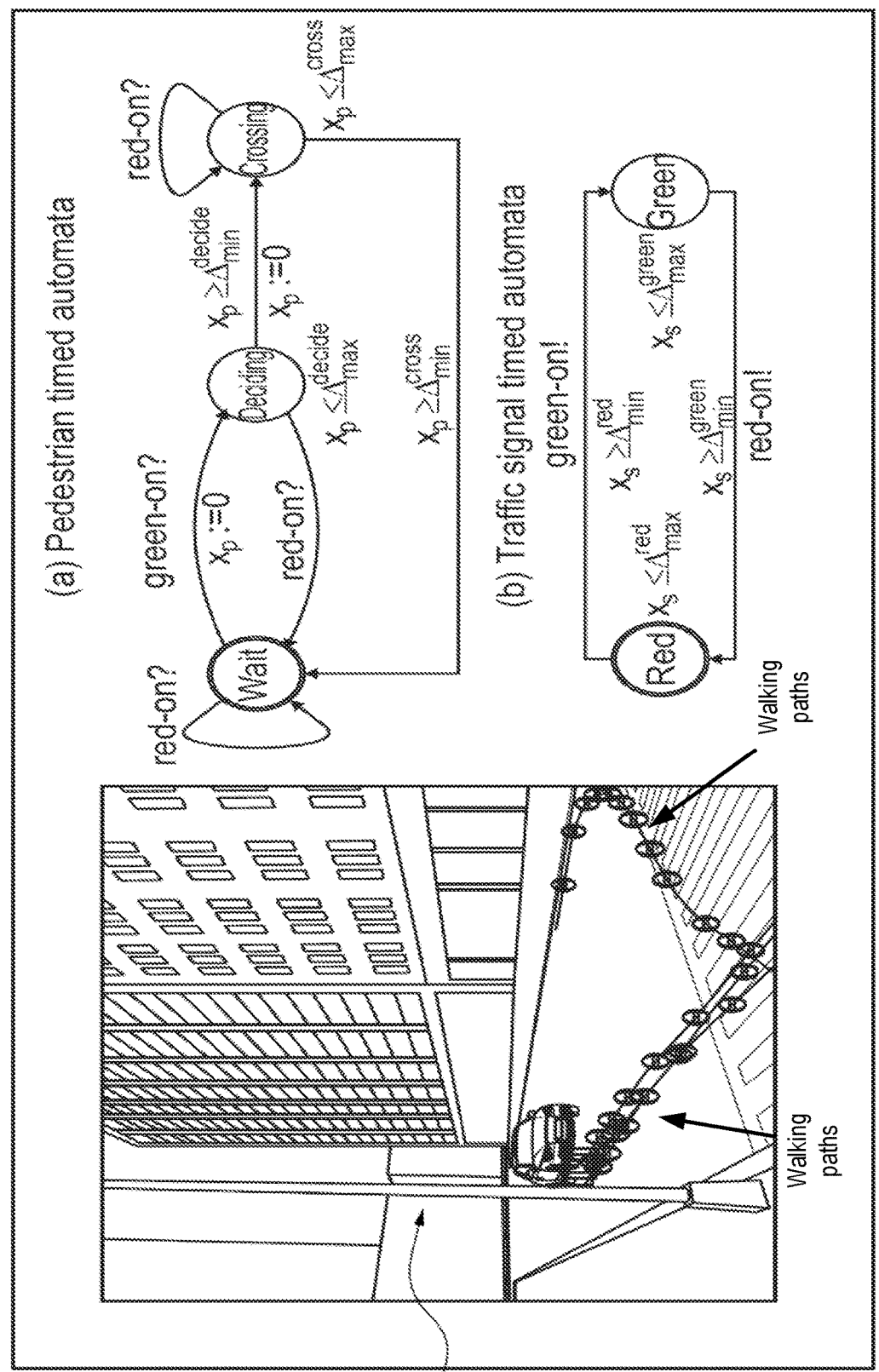
FIG. 5B is a block diagram illustrating an example of an intersection in a digital simulation and the behavior specification for a virtual pedestrian crossing the intersection according to some embodiments.

Referring now to FIG. 5B, depicted is a block diagram illustrating an example 501 of an intersection in a digital simulation and the behavior specification for a virtual pedestrian crossing the intersection of a digital simulation according to some embodiments.

FIGS. 6 and 7 are described together. FIG. 6 depicts a block diagram illustrating an input visualization 600 for inputting variables for a path specification according to some embodiments. FIG. 7 depicts a block diagram illustrating an input visualization 700 for inputting variables for a behavior specification according to some embodiments. In some embodiments, the input visualization 600 of FIG. 6 and the input visualization 700 of FIG. 7 are combined to form a single input visualization for both the behavior specification and the path specification.

An embodiment of the pedestrian generation module 199 is now described with reference to the input visualizations 600, 700. Consider n path specifications and m behavior specifications, wherein n and m are variables that represent any positive whole number. A user 106 decides a number of virtual pedestrians to be generated. The user 106 inputs this number to the pedestrian generation module 199 by populating a number of rows of the input visualization 600 that corresponds to the number of virtual pedestrians to be generated. For example, if the number is five, then the user 106 inputs variables into five rows of the input visualization 600. Walking paths for these virtual pedestrians are automatically generated by the pedestrian generation module 199 from all path specifications described by the path specification data 194 (or path specifications randomly selected from the path specification data 194). The timing parameters (e.g., how long pedestrian will wait to cross after the signal change) of the behavior model for each virtual pedestrian is decided by the pedestrian generation module 199 randomly using the behavior specification data 195 (or from an existing probabilistic distribution) to generate behaviors for these virtual pedestrians. In some embodiments, these timing parameters are generated based at least in part on the variables inputted by the user 106 into the input visualization 700. In some embodiments, the generation of the timing parameters (e.g., the behavior specification for a particular virtual pedestrian) may be repeated for each virtual pedestrian so that each virtual pedestrian has its own behavior model, which represents its unique behavior relative to the other virtual pedestrians. The generated walking paths and behaviors (i.e., timing parameters) are composed together as a pair by the pedestrian generation module 199 for each individual virtual pedestrians, and virtual pedestrian data 198 describing these composed pairs (the virtual pedestrian data 198 describes one composed pair for each virtual pedestrian) is passed to the simulation tool. The simulation tool then uses the virtual pedestrian data 198 to visualize a set of virtual pedestrians that conforms to the path specification and the behavior specification.

Referring to FIG. 6, depicted is variable data for six example path specifications to be generated by the pedestrian generation module 199. The six path specifications define walking paths for six virtual pedestrians in a digital simulation using one or more of the following variables: a number of directional changes (e.g., path specification #1 defines that each walking path has three directional changes on the crosswalk); a distance between successive directional changes (e.g. path specification #1 defines that a distance between any successive directional change is determined in between one meter and five meters); the area where the pedestrian is allowed to walk (e.g., the margin size for path specification #3 defines that any virtual pedestrian is allowed to walk no more than three meters outside of the crosswalk); and the number of walking paths to be generated for each path specification (e.g., path specifications #1 through #6 each define that twenty walking paths are to be generated).

Referring to FIG. 7, depicted is variable data for four example behavior specifications to be generated by the pedestrian generation module 199. The behavior specifications define how virtual pedestrians change their modes of interaction with the virtual roadway environment included in the digital simulation. In some embodiments, the behavior specifications define how virtual pedestrians change their modes of interaction with the virtual roadway environment so that the virtual pedestrians behave in accordance with the semantics of one or more timed automata (see, e.g., FIGS. 5A and 5B for examples of timed automata). For example, a traffic signal changes from green to red and red to green. The virtual pedestrian is expected to cross an interaction on the green light, but not on the red light (but this might not occur, for example, if a behavior module defines illegal activity for the virtual pedestrian in some respects).

A behavior specification #1 as defined in FIG. 7 according to some embodiments requires that a virtual pedestrian begin crossing the intersection immediately after the signal change because the minimum and maximum waiting time are each defined as zero. The behavior specification #1 also requires that the virtual pedestrian successfully finish crossing the intersection before the signal changes from green to red.

A behavior specification #2 as defined in FIG. 7 according to some embodiments requires that a virtual pedestrian may start crossing in between two and five seconds after the signal change. The behavior specification #2 also requires that the virtual pedestrian successfully finish crossing the intersection before the signal changes from green to red.

A behavior specification #3 as defined in FIG. 7 according to some embodiments requires that a virtual pedestrian start crossing the intersection two seconds before the signal change, which is an example of a behavior specification requiring that a virtual pedestrian model illegal behavior so that the digital simulation determines whether the virtual ADAS system can protect a virtual pedestrian that is behaving illegally and unexpectedly. The behavior specification #3 also requires that the virtual pedestrian successfully finish crossing the intersection before the signal changes from green to red.

A behavior specification #4 as defined in FIG. 7 according to some embodiments requires that a virtual pedestrian start crossing the intersection between two seconds and five seconds before the signal change, which is another example of a behavior specification requiring that a virtual pedestrian model illegal behavior so that the digital simulation determines whether the virtual ADAS system can protect a virtual pedestrian that is behaving illegally and unexpectedly. The behavior specification #1 also requires that the virtual pedestrian fail to finish crossing the intersection before the signal changes from green to red, which is another example of illegal and unexpected behavior that is tested for by the digital simulation.

Figure 12:
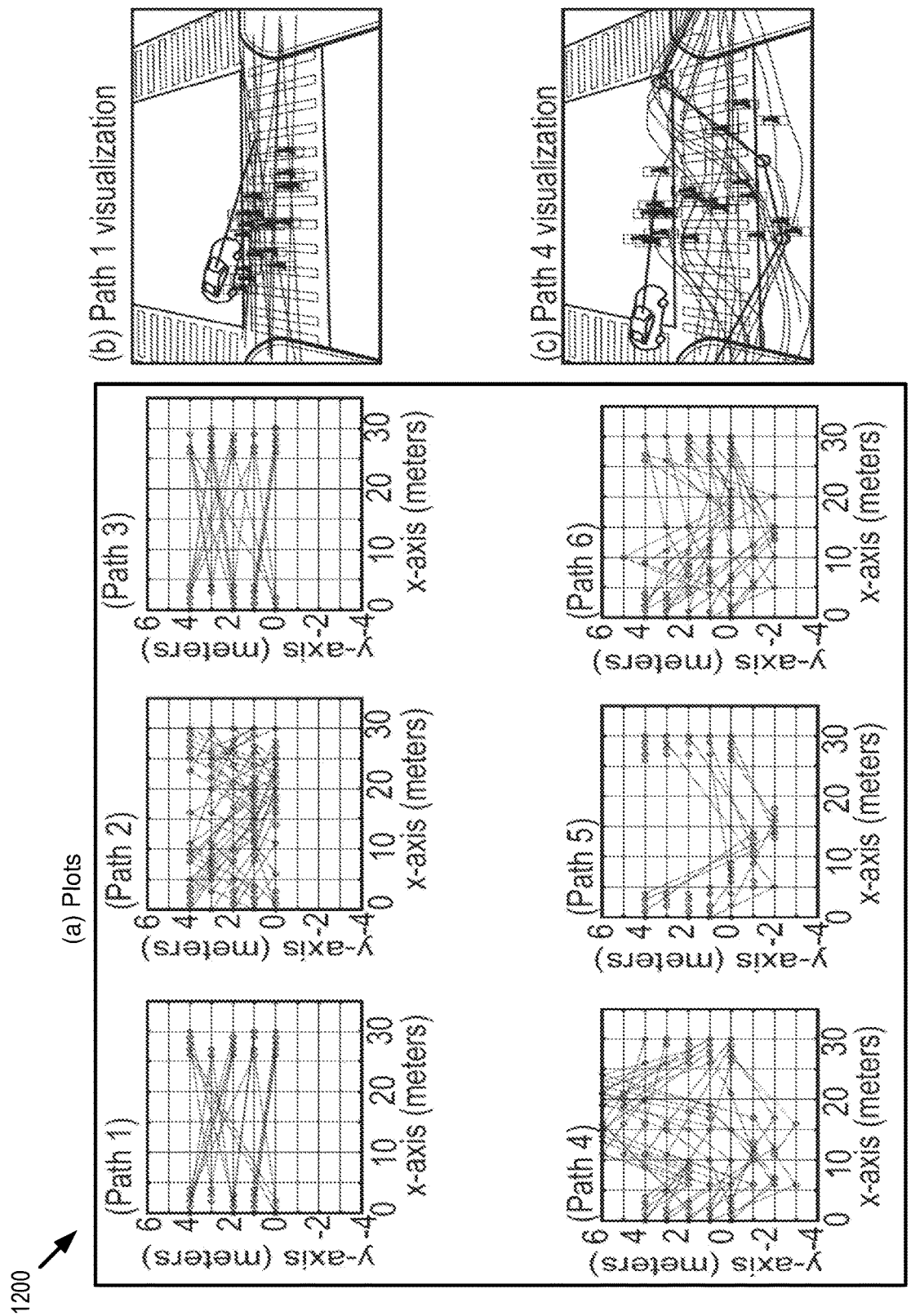
FIG. 12 is a block diagram illustrating a plurality of walking paths according to some embodiments.

Referring to FIGS. 6 and 7 collectively, the simulation tool set includes a game engine (e.g., Unity 3D or some other game engine). FIG. 12 depicts an example of one or more digital simulations being generated based on the path specifications and behavior specifications as described above for FIGS. 6 and 7. FIG. 12 shows the visualization of the generated walking paths from the six path specifications described above with reference to FIG. 6. Twenty virtual pedestrians are created and mapped to each walking path specified by the six path specifications of FIG. 6. In addition, each virtual pedestrian is associated with a logic that implements the semantics of the behavior defined by each behavior specification of FIG. 7. As a result, each pedestrian moves along the assigned path generated from the path specifications of FIG. 6, and behaves in accordance with the behavior model generated from the behavior specifications of FIG. 7. F Referring now to FIG. 8, depicted a block diagram illustrating a first visualization 800 according to some embodiments. The first visualization 800 visually depicts six different walking paths from a series of digital simulations. The six different walking paths depicted in FIG. 8 are relevant to whether the design for the virtual ADAS system, as embodied in the ADAS model data 196, should be modified to better protect the virtual pedestrians. The six different walking paths depicted in the first visualization 800 correspond to the path specifications defined in the input visualization 600 described above with reference FIG. 6. The virtual pedestrians depicted in the first visualization 800 behave in accordance with the behavior specifications defined in the input visualization 700 described above with reference FIG. 7.

Referring now to FIG. 9, depicted is a block diagram illustrating a second visualization 900 according to some embodiments. The second visualization 900 describes the performance of the virtual ADAS system being tested for the six path specifications described above for FIG. 6 and the three behavior specifications described above for FIG. 7.

Figure 10:
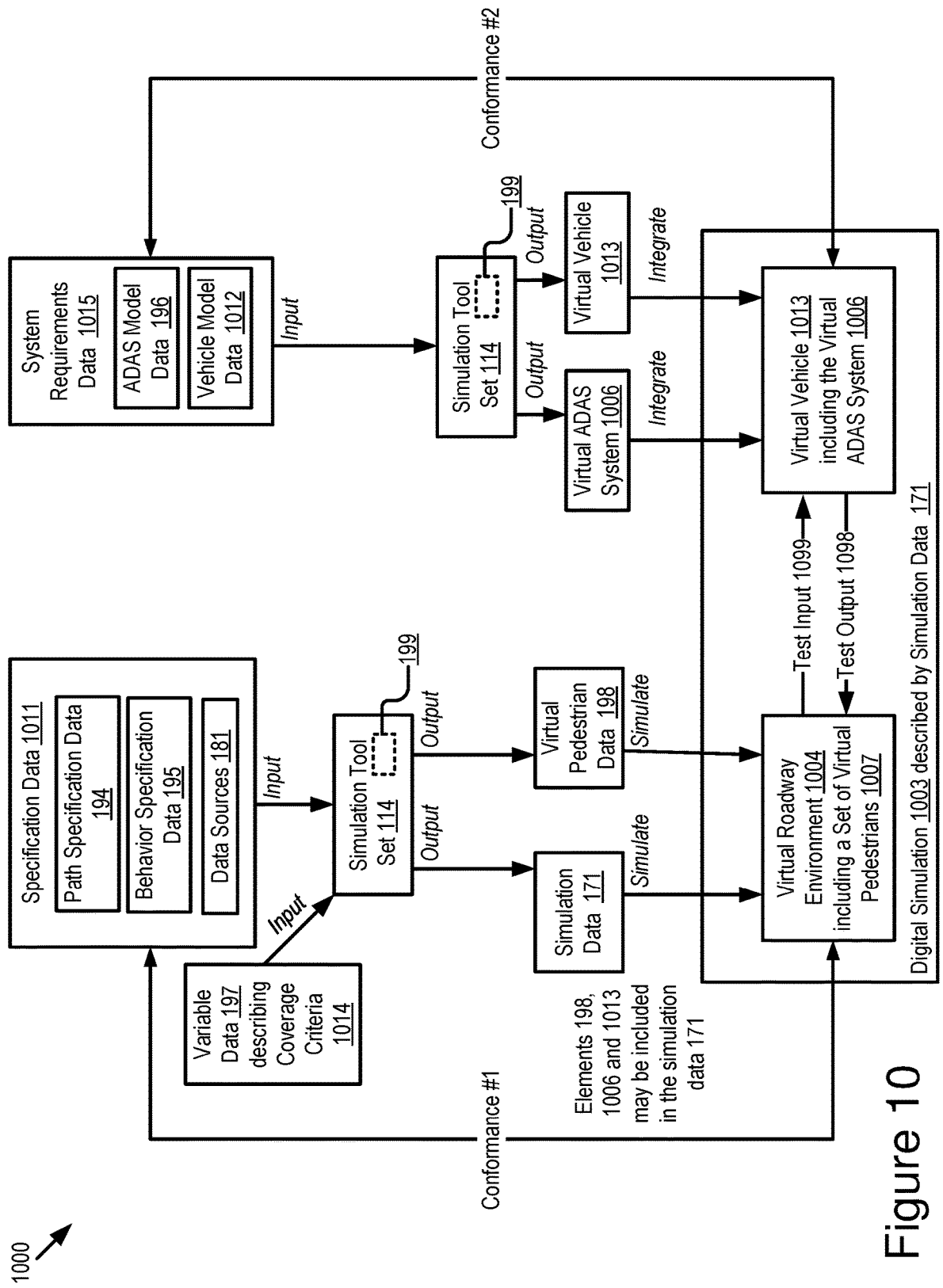
FIG. 10 is a block diagram illustrating a process flow for generating a digital simulation that conforms to specification data and system requirements data according to some embodiments.

Referring now to FIG. 10, depicted is a block diagram illustrating a process flow 1000 for generating a digital simulation that conforms to specification data 1011 and data sources 181 according to some embodiments.

Referring to the left-hand side of FIG. 10 and "Conformance #1," depicted is a sub-process for generating a virtual roadway environment 1004 that includes a set of virtual pedestrians 1007 that conform with the path specification data 194 and the behavior specification data 195 included in the specification data 1011. The simulation tool set 114 includes the pedestrian generation module 199. The specification data 1011 and the variable data 197 are received. Responsive to these inputs, the simulation tool set 114 generates the simulation data 117 and the pedestrian generation module generates the virtual pedestrian data 198. The virtual pedestrian data 198 may be incorporated in the simulation data 171. The simulation tool set 114 then generates a digital simulation 1003. The digital simulation includes a virtual roadway environment 1004 that includes a set of virtual pedestrians 1007. The set of virtual pedestrians 1007 conforms to the path specifications and the behavior specifications described by the specification data 1011. This conformity is what is meant by the label "Conformance #1" depicted in FIG. 10.

In some embodiments, the variable data 197 describes one or more coverage criteria 1014. The variables described above for FIGS. 6 and 7 are examples of coverage criteria 1014. Additional examples of coverage criteria 1014 are described below with reference to FIGS. 11A-11C.

Referring to the right-hand side of FIG. 10 and "Conformance #2," depicted is a sub-process for generating a virtual vehicle 1005 including a virtual ADAS system 1006 that conforms with the system requirements data 1015. The system requirements data 1015 is digital data that includes the ADAS model data 196 and vehicle model data 1012.

Vehicle model data 1012 is digital data that describes a design of the virtual vehicle 1005. The vehicle model data 1012 includes any digital data and information necessary to cause the simulation tool set 114 to generate the virtual vehicle 1005 for inclusion in the digital simulation 1003. The ADAS model data 196 may be included in the vehicle model data 1012. The simulation tool set 114 includes a simulation tool and a game engine. The simulation tool generates simulation data 171 based on the system requirements data 1015. The simulation data 171 is digital data that describes a digital simulation 1003 that includes the set of virtual pedestrians described by the virtual pedestrian data 198 and a virtual vehicle 1013 that includes the virtual ADAS system 1006. In this way, in some embodiments the simulation data 171 includes the virtual pedestrian data 198 and digital data that describes the virtual ADAS system 1006 and the virtual vehicle 1013. The game engine generates the digital simulation 1003 based on the simulation data 171. The digital simulation 1003 may be displayed on the display 192. The virtual vehicle 1013 that includes the virtual ADAS system 1006 conforms with the system requirements data 1015. This conformity is what is meant by the label "Conformance #2" depicted in FIG. 10.

The virtual roadway environment 1004 is a test input 1099 for the virtual ADAS system 1006 because the virtual ADAS system 1006 must respond to the set of virtual pedestrians 1007. The set of virtual pedestrians 1007 includes one or more virtual pedestrians that conform to the path specification and the behavior specification, described by the path specification data 194 and the behavior specification data 195 respectively. The virtual ADAS system 1006 controls the operation of the virtual vehicle 1013, including steering the virtual vehicle 1013 and braking the virtual vehicle 1013 responsive to the presence of the set of virtual pedestrians 1007 in the virtual roadway environment 1004. The virtual vehicle 1013 itself is present in the virtual roadway environment 1004, and is responding to the presence of the set of virtual pedestrians 1007 as they cross an intersection included in the virtual roadway environment 1004. This responding to the presence of the set of virtual pedestrians 1007 is a test output 1098 that is included in the virtual roadway environment 1004. The pedestrian generation module 199 monitors for this test output 1098 and records digital data that describes this test output 1098. This digital data is included in the visualization depicted in FIG. 12 that depicts measurements of the performance of the virtual ADAS system 1006 to protect the set of virtual pedestrians 1007.

Figure 11A:
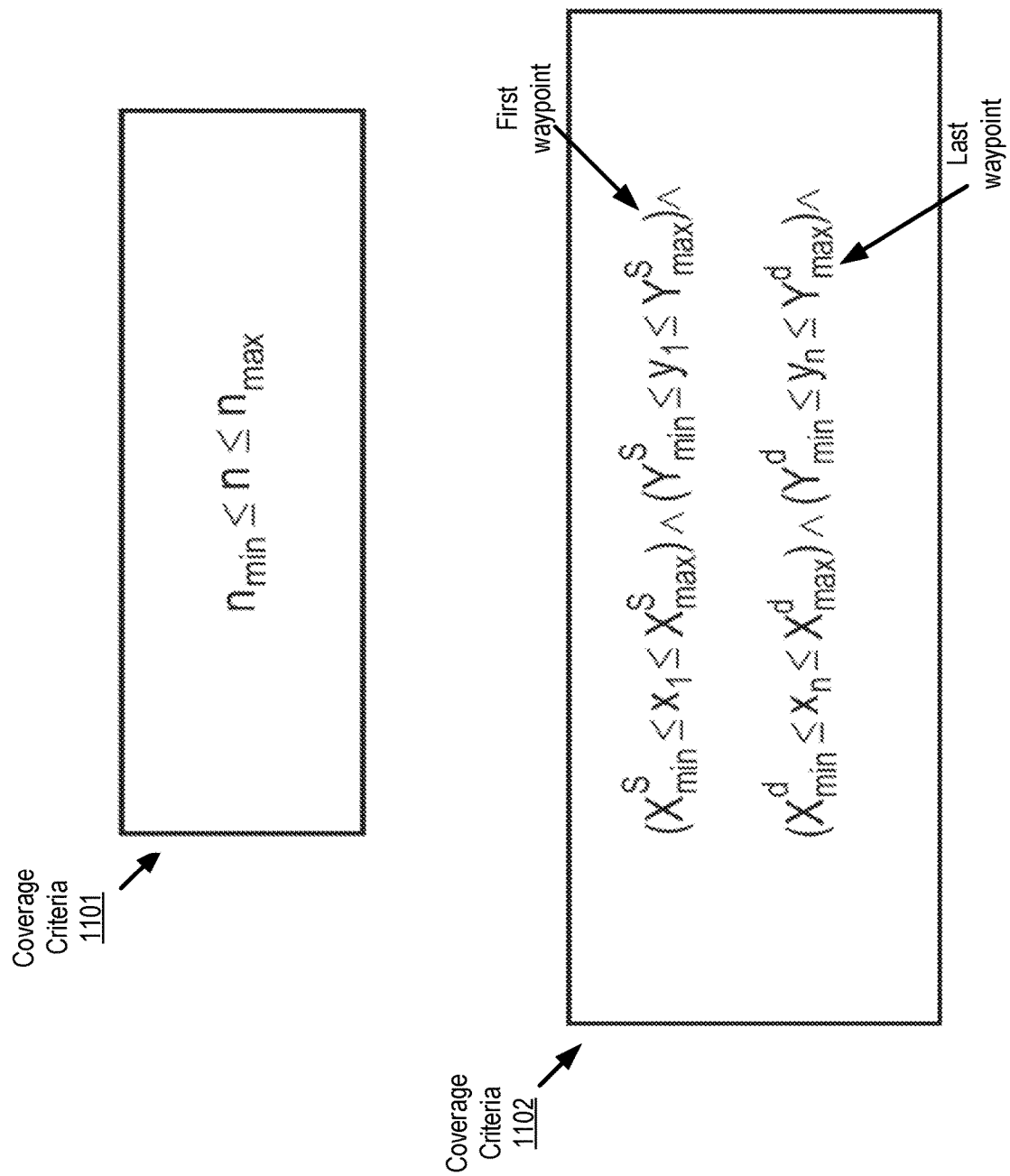
FIGS. 11A-11C are block diagrams illustrating examples of coverage criteria according to some embodiments.
Figure 11B:
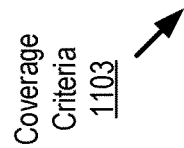
Figure 11C:
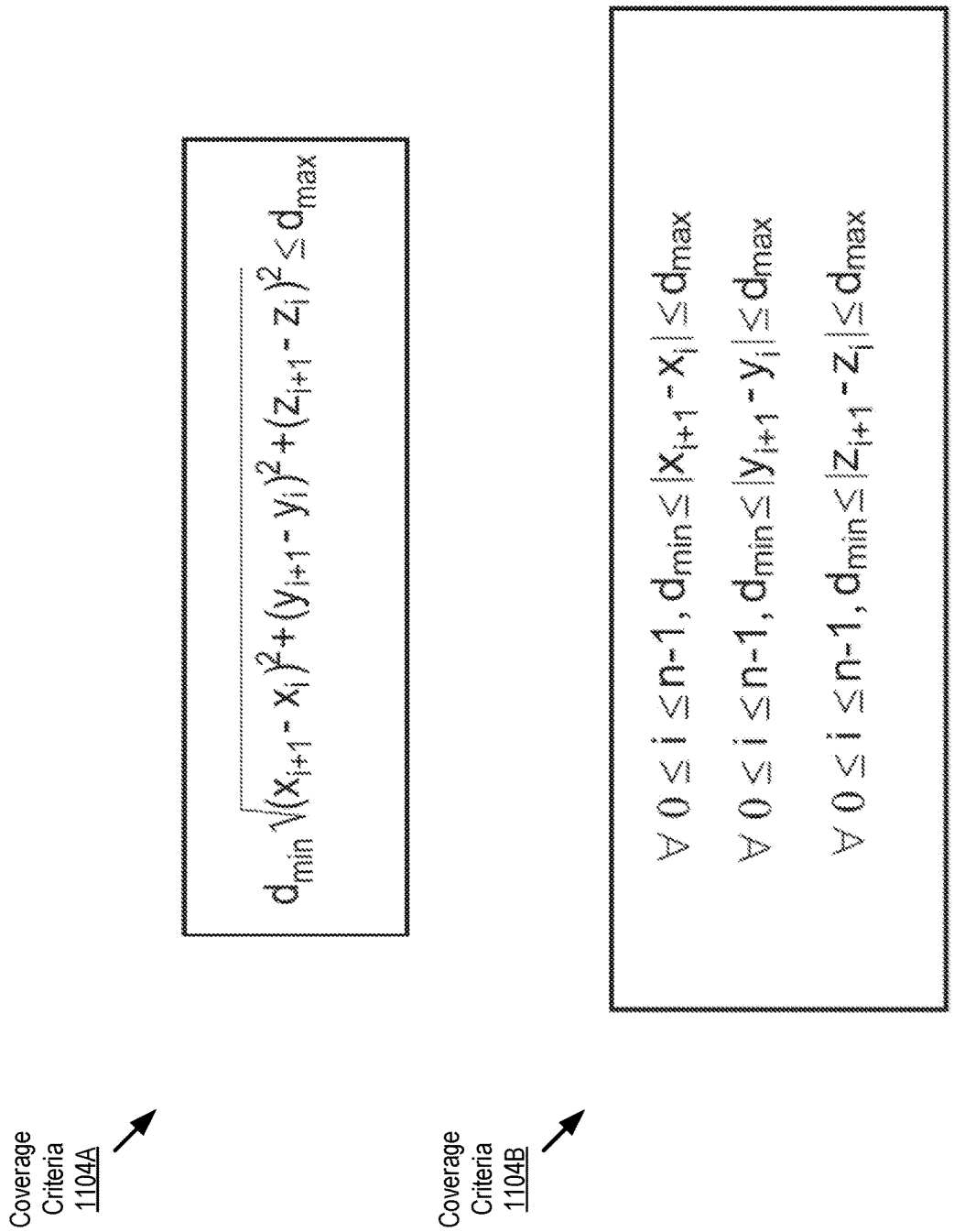

Referring now to FIGS. 11A-11C, depicted are block diagrams illustrating example coverage criteria according to some embodiments.

Referring to FIG. 11A, depicted is: (1) a coverage criteria 1101 which defines a number of waypoints used for a path specification; and (2) a coverage criteria 1102 that defines a start region and an end region for a path specification.

The coverage criteria 1101 includes the constraint "n." A walking path for a virtual pedestrian includes zero or more directional changes as the virtual pedestrian crosses an intersection. A point at which the virtual pedestrian changes their direction is referred to as a waypoint. The constraint "n" defines the number of waypoints for a walking path generated based on a particular path specification. The constraint "n" is defined using the boundary parameters "$n_{min}$" and "$n_{max}$." Accordingly, a user 106 of the input visualization 600 defines a minimum and maximum value for "n." See, e.g., the middle column depicted in FIG. 6 that includes minimum and maximum values for the distance between two adjacent direction changes for a plurality of path specifications. Accordingly, the constraint "n" is a variable of the path specification that is user configurable using an input visualization provided by the pedestrian generation module 199.

Referring now to the coverage criteria 1102. The index for a first waypoint (e.g., "$x_1, y_1$") and a last waypoint (e.g., "$x_n, y_n$") in a particular walking path are determinable by the coverage criteria 1101. The top portion of the coverage criteria 1102 is concerned with the first waypoint for a walking path built based on a path specification and the last waypoint for this walking path. The coverage criteria 1102 defines a rectangular area for both a start region (i.e., rectangular area "$A^s$") and an end region (i.e., rectangular area "$A^d$") for a walking path. The coverage criteria 1102 is specified with: the known boundary parameters of the rectangular area for the start region (i.e., $x^s_{min}$, $x^s_{max}$, $y^s_{min}$, $y^s_{max}$) and the rectangular area for the end region (i.e., $x^d_{min}$, $x^d_{max}$, $y^d_{min}$, $y^d_{max}$); and the unknown coordinates of the first waypoint (e.g., "$x_1, y_1$") and the last waypoint (e.g., "$x_n, y_n$").

Referring now to FIG. 11B, depicted is a coverage criteria 1103 which defines a degree of the directional changes by a virtual pedestrian while crossing an intersection. The degree of directional changes are characterized by the coverage criteria 1103 with using any three consecutive waypoints on a walking path. For example, the degree of the three directional changes, $\theta_1$, $\theta_2$ and $\theta_3$, included in the example 401 of FIG. 4B are characterized in terms of the following three sets of coordinates: {(4,0), (3,5), (4,10)}, {(3,5)(4,10), (1,15)} and {(4,10), (1,15), (0,35)}. The coverage criteria 1103 is expressed setting these coordinates as unknown variables in the in the coverage criteria 1103, while setting the minimum and maximum bounds of directional changes as known variables in the coverage criteria 1103.

The coverage criteria 1103 is specified with the known boundary parameters (i.e., $\theta_{min}$ and $\theta_{max}$) and the unknown three consecutive coordinates (e.g., $x_i$, $x_{i+1}$, $x_{i+2}$). The degree is characterized as a difference between two successive slopes. This difference is bounded between the known minimum and maximum boundary parameters (i.e., $\theta_{min}$ and $\theta_{max}$). As a result, the coverage criteria 1103 affects the path specification by ensuring that the degree of directional changes between waypoints is always above the minimum boundary parameter, $\theta_{min}$, and above the maximum boundary parameter, $\theta_{max}$.

Referring now to FIG. 11C, depicted is a coverage criteria 1104A and 1104B which together define a distance between successive directional changes. A directional change occurs on each waypoint of a walking path. Therefore, a distance between successive directional changes is characterized in terms of two coordinates of the waypoints. There are several ways to characterize a distance. The coverage criteria 1104A and 1104B are characterized using a Euclidian distance, but other ways of characterizing the distance may be used.

The coverage criteria 1104A, 1104B include the unknown parameters are the x, y and z coordinates ($x_i$, $x_{i+1}$, $y_i$, $y_{i+1}$, $z_i$, $z_{i+1}$). The coverage criteria 1104A, 1104B include the boundary parameters (i.e., $d_{min}$ and $d_{max}$) as the known parameters.

Referring now to FIG. 12, depicted is a block diagram illustrating a visualization 1200 including a plurality of walking paths according to some embodiments.

The walking paths depicted in the visualization 1200 are generated based on the path specifications described above with reference to FIG. 6 and the behavior specifications described above with reference to FIG. 7. Element A of the visualization includes six plots where the x-axis and y-axis indicate the position of a walking path with respect to the position of the intersection. Elements B and C show how the walking paths generated from the path specification #1 and the path specification #4 are visualized in the game engine. Twenty virtual pedestrians are created and mapped to each walking path. In addition, each virtual pedestrian is associated with a logic that implements the semantics of the behavior model generated from each behavior specification. As a result, each virtual pedestrian moves along their assigned walking path (generated from the path specification) according to the behavior (generated from the behavior specification).

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   automatically generating, for a virtualized testing of a virtual vehicle that does not exist in a real-world, a set of virtual pedestrians based on a path specification, a behavior specification, and variable data that describes one or more variables that are inputted by a user including a minimum waiting time and a maximum waiting time for beginning to cross an intersection after a traffic signal indicates that it is legal to cross the intersection, wherein each virtual pedestrian in the set of virtual pedestrians is associated with a unique combination of the path specification, the behavior specification, and the variable data;
   executing a digital simulation that includes the set of virtual pedestrians crossing the intersection and the virtual vehicle responding to the set of virtual pedestrians crossing the intersection, wherein the digital simulation is operable to measure a performance of a virtual Advanced Driver Assistance System (virtual ADAS system) included in the virtual vehicle to protect the set of virtual pedestrians when responding to the set of virtual pedestrians crossing the intersection;
   determining that the virtual ADAS system did not perform in compliance with a design specification; and
   determining a recommendation for modifying a design of the virtual ADAS system.

2. The method of claim 1, wherein the path specification describes a path constraint of a virtual pedestrian of the set of virtual pedestrians within the digital simulation and the variable data includes a number of virtual pedestrians to be generated, whether any of the virtual pedestrians will break a legal rule pertaining to a crosswalk, and whether any of the virtual pedestrians will finish crossing the intersection before the traffic signal indicates that it is no longer legal to cross the intersection.

3. The method of claim 1, wherein the path specification describes one or more of the following: how many times a virtual pedestrian of the set of virtual pedestrians changes direction while crossing the intersection; a distance traveled by the virtual pedestrian between two successive directional changes while crossing the intersection; a start region for the virtual pedestrian to begin their crossing of the intersection and an end region for the virtual pedestrian to end their crossing of the intersection; or a crosswalk area at the intersection where the virtual pedestrian crosses the intersection, wherein the crosswalk area includes a crosswalk and area proximate to the crosswalk where the virtual pedestrian crosses the intersection to model illegal behavior.

4. The method of claim 1, wherein the variable data describes coverage criteria that defines a number of waypoints used for the path specification and that defines a start region and an end region for the path specification.

5. The method of claim 1, further comprising:
providing first graphical data to a display to cause the display to depict a first visualization that visually describes the digital simulation; and
providing second graphical data to depict a second visualization that includes data structures describing the performance of the virtual ADAS system and the recommendation for modifying the design of the virtual ADAS system.

6. The method of claim 1, wherein the behavior specification includes one or more timed automata that describes how the set of virtual pedestrians react to an event within the digital simulation as time changes within the digital simulation.

7. The method of claim 1, wherein the behavior specification describes one or more of the following: how long a virtual pedestrian of the set of virtual pedestrians will wait for crossing the intersection once a traffic light changes from red to green; or how the virtual pedestrian modifies its walking speed as the traffic light is about to change from green to red.

8. The method of claim 1, wherein the path specification and the behavior specification are determined using digital data that describes one or more real-world accident reports that describe a walking path and behavior of one or more real-world pedestrians who were injured by vehicles at one or more real-world roadway intersections.

9. The method of claim 1, wherein automatically generating the set of virtual pedestrian includes the set of virtual pedestrians being automatically generated without the user providing inputs specific to each virtual pedestrian in the set of virtual pedestrians so that a workload of the user is decreased relative to being required to provide the inputs specific to each of the virtual pedestrians.

10. A computer program product comprising a non-transitory memory storing computer-executable code that, when executed by a processor, causes the processor to:
automatically generate, for a virtualized testing of a virtual vehicle that does not exist in a real-world, a set of virtual pedestrians based on a path specification, a behavior specification, and variable data that describes one or more variables that are inputted by a user including a minimum waiting time and a maximum waiting time for beginning to cross an intersection after a traffic signal indicates that it is legal to cross the intersection, wherein each virtual pedestrian in the set of virtual pedestrians is associated with a unique combination of the path specification, the behavior specification, and the variable data;
execute a digital simulation that includes the set of virtual pedestrians crossing the intersection and the virtual vehicle responding to the set of virtual pedestrians crossing the intersection, wherein the digital simulation is operable to measure a performance of a virtual Advanced Driver Assistance System (virtual ADAS system) included in the virtual vehicle to protect the set of virtual pedestrians when responding to the set of virtual pedestrians crossing the intersection;
determine that the virtual ADAS system did not perform in compliance with a design specification; and
determine a recommendation for modifying a design of the virtual ADAS system.

11. The computer program product of claim 10, wherein the path specification describes a path constraint of a virtual pedestrian of the set of virtual pedestrians within the digital simulation and the variable data includes a number of virtual pedestrians to be generated, whether any of the virtual pedestrians will break a legal rule pertaining to a crosswalk, and whether any of the virtual pedestrians will finish crossing the intersection before the traffic signal indicates that it is no longer legal to cross the intersection.

12. The computer program product of claim 10, wherein the path specification describes one or more of the following: how many times a virtual pedestrian of the set of virtual pedestrians changes direction while crossing the intersection; a distance traveled by the virtual pedestrian between two successive directional changes while crossing the intersection; a start region for the virtual pedestrian to begin their crossing of the intersection and an end region for the virtual pedestrian to end their crossing of the intersection; or a crosswalk area at the intersection where the virtual pedestrian crosses the intersection, wherein the crosswalk area includes a crosswalk and area proximate to the crosswalk where the virtual pedestrian crosses the intersection to model illegal behavior.

13. The computer program product of claim 10, wherein the path specification and the behavior specification are determined using digital data that describes one or more of industry testing standards or manufacture testing standards that describe a walking path and behavior of one or more real-world pedestrians.

14. The computer program product of claim 10, wherein the computer-executable code further causes the processor to:
provide first graphical data to a display to cause the display to depict a first visualization that visually describes the digital simulation; and
provide second graphical data to depict a second visualization that includes data structures describing the performance of the virtual ADAS system and the recommendation for modifying the design of the virtual ADAS system.

15. The computer program product of claim 10, wherein the behavior specification includes one or more timed automata that describes how the set of virtual pedestrians react to an event within the digital simulation as time changes within the digital simulation.

16. The computer program product of claim 10, wherein the behavior specification describes one or more of the following: how long a virtual pedestrian of the set of virtual pedestrians will wait for crossing the intersection once a traffic light changes from red to green; or how the virtual pedestrian modifies its walking speed as the traffic light is about to change from green to red.

17. The computer program product of claim 10, wherein the path specification and the behavior specification are determined using digital data that describes one or more real-world accident reports that describe a walking path and behavior of one or more real-world pedestrians who were injured by vehicles at one or more real-world roadway intersections.

18. The computer program product of claim 10, wherein automatically generating the set of virtual pedestrian includes the set of virtual pedestrians being automatically generated without the user providing inputs specific to each virtual pedestrian in the set of virtual pedestrians so that a workload of the user is decreased relative to being required to provide the inputs specific to each of the virtual pedestrians.

19. The computer program product of claim 10, wherein the set of virtual pedestrians are generated based on one or more real-world accident reports.

20. A system comprising:
- a processor communicatively coupled to a display and a non-transitory memory, wherein the processor is operable to execute computer code stored in the non-transitory memory and the computer code is operable, when executed by the processor, to cause the processor to:
  - automatically generate, for a virtualized testing of a virtual vehicle that does not exist in a real-world, a set of virtual pedestrians based on a path specification, a behavior specification, and variable data that describes one or more variables that are inputted by a user including a minimum waiting time and a maximum waiting time for beginning to cross an intersection after a traffic signal indicates that it is legal to cross the intersection, wherein each virtual pedestrian in the set of virtual pedestrians is associated with a unique combination of the path specification, the behavior specification, and the variable data;
- execute a digital simulation that includes the set of virtual pedestrians crossing the intersection and the virtual vehicle responding to the set of virtual pedestrians crossing the intersection, wherein the digital simulation is operable to measure a performance of a virtual Advanced Driver Assistance System (virtual ADAS system) included in the virtual vehicle to protect the set of virtual pedestrians when responding to the set of virtual pedestrians crossing the intersection;
- determine that the virtual ADAS system did not perform in compliance with a design specification; and
- determine a recommendation for modifying a design of the virtual ADAS system.

* * * * *